US011483806B2

(12) United States Patent
Matsumura et al.

(10) Patent No.: US 11,483,806 B2
(45) Date of Patent: Oct. 25, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,750

(22) PCT Filed: Feb. 2, 2018

(86) PCT No.: PCT/JP2018/003545
§ 371 (c)(1),
(2) Date: Aug. 1, 2019

(87) PCT Pub. No.: WO2018/143394
PCT Pub. Date: Aug. 9, 2018

(65) Prior Publication Data
US 2019/0357204 A1     Nov. 21, 2019

(30) Foreign Application Priority Data
Feb. 2, 2017    (JP) .............................. JP2017-017974

(51) Int. Cl.
| H04W 4/00 | (2018.01) |
| H04W 72/04 | (2009.01) |
| H04L 5/00 | (2006.01) |
| H04L 27/26 | (2006.01) |

(52) U.S. Cl.
CPC ....... *H04W 72/0413* (2013.01); *H04L 5/0053* (2013.01); *H04L 27/2613* (2013.01); *H04W 72/0453* (2013.01)

(58) Field of Classification Search
CPC .......... H04W 72/0413; H04W 72/0453; H04L 5/0053; H04L 27/2613
See application file for complete search history.

(56) References Cited

U.S. PATENT DOCUMENTS

2010/0074210 A1*   3/2010   Gaal ....................... H04J 13/00
                                                                                                               370/329
2010/0177694 A1*   7/2010   Yang ..................... H04L 5/0053
                                                                                                               370/328
(Continued)

FOREIGN PATENT DOCUMENTS

EP          2 597 800 A2     5/2013

OTHER PUBLICATIONS

International Search Report issued in PCT/JP2018/003545 dated Apr. 24, 2018 (5 Pages).
(Continued)

*Primary Examiner* — Siren Wei
(74) *Attorney, Agent, or Firm* — Osha Bergman Watanabe & Burton LLP

(57) ABSTRACT

The present invention is designed so that, even when a sequence-based uplink control channel is used, uplink control information is reported properly. A user terminal according to one aspect of the present invention has a control section that determines signals to transmit in a frequency resource for transmitting uplink control information, and a transmission section that transmits the signals in the frequency resource, and, when the signals include a signal sequence to use an orthogonal resource that is associated with the uplink control information, the control section assumes that a bandwidth of the frequency resource is equal to or greater than a predetermined bandwidth.

8 Claims, 21 Drawing Sheets

SEQUENCE TYPE 0

(56) References Cited

U.S. PATENT DOCUMENTS

| | | | | |
|---|---|---|---|---|
| 2011/0250918 | A1* | 10/2011 | Jen | H04W 52/365 |
| | | | | 455/517 |
| 2012/0082263 | A1* | 4/2012 | Ebrahimi Tazeh Mahalleh | |
| | | | | H04L 1/1607 |
| | | | | 375/299 |
| 2013/0051342 | A1* | 2/2013 | Aiba | H04L 1/1671 |
| | | | | 370/329 |
| 2013/0114461 | A1 | 5/2013 | Seo et al. | |
| 2016/0192388 | A1 | 6/2016 | Ekpenyong et al. | |
| 2019/0342135 | A1* | 11/2019 | Kwak | H04L 5/0053 |

OTHER PUBLICATIONS

Written Opinion of the International Searching Authority issued in PCT/JP2018/003545 dated Apr. 24, 2018 (3 Pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).

Extended European Search Report in counterpart European Application No. 18748461.3 dated Dec. 4, 2020 (9 pages).

Office Action issued in European Application No. 18748461.3; dated Jul. 20, 2021 (7 pages).

Office Action issued in the counterpart Chinese Patent Application No. 201880019365.5, dated Oct. 11, 2021 (13 pages).

Office Action issued in European Application No. 18748461.3; dated Dec. 16, 2021 (8 pages).

Office Action in counterpart European Patent Application No. 18 748 461.3 dated May 3, 2022 (8 pages).

Office Action in counterpart Chinese Patent Application No. 201880019365.5 dated May 24, 2022 (9 pages).

* cited by examiner

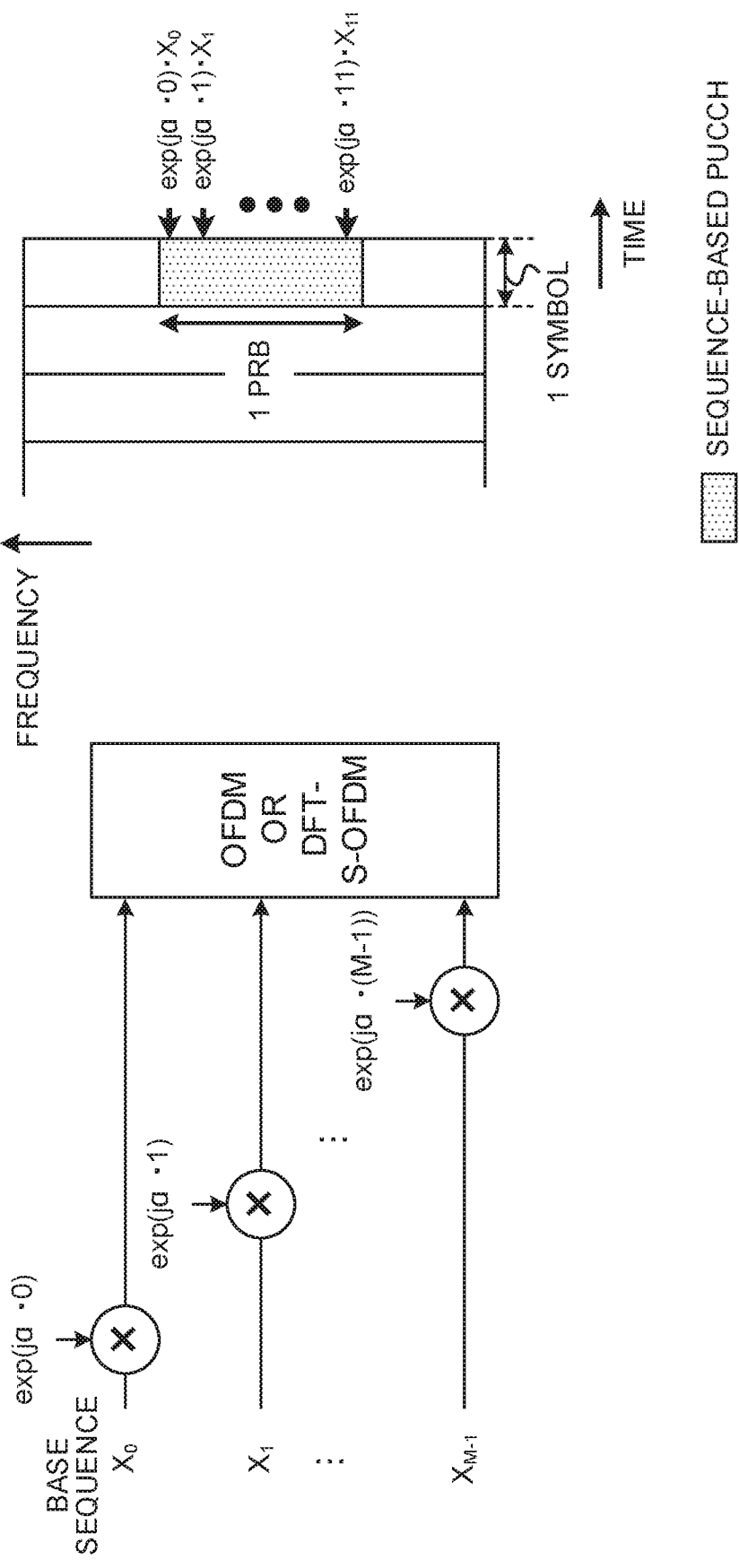

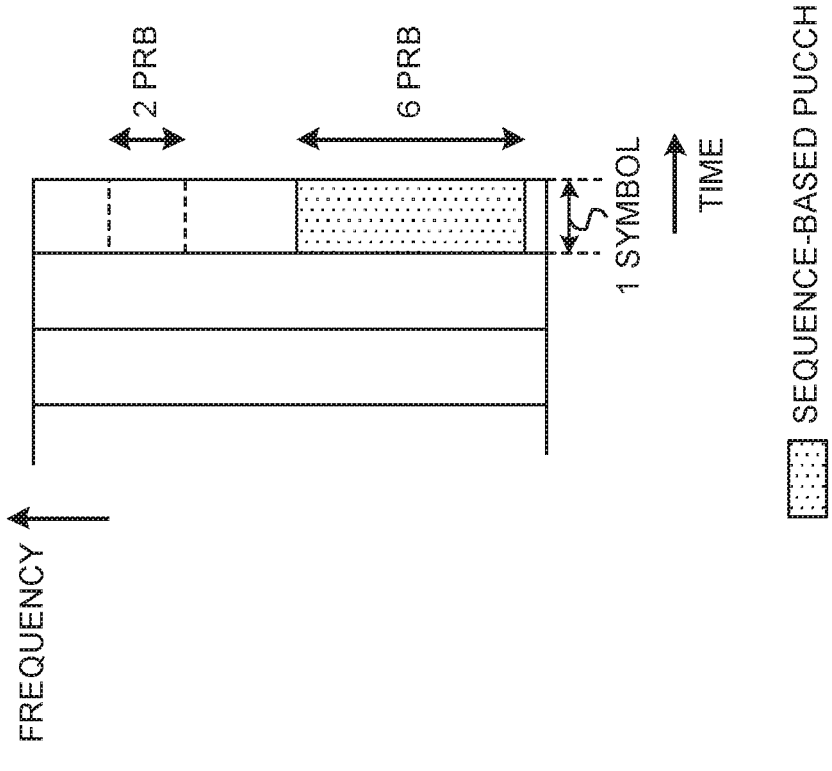
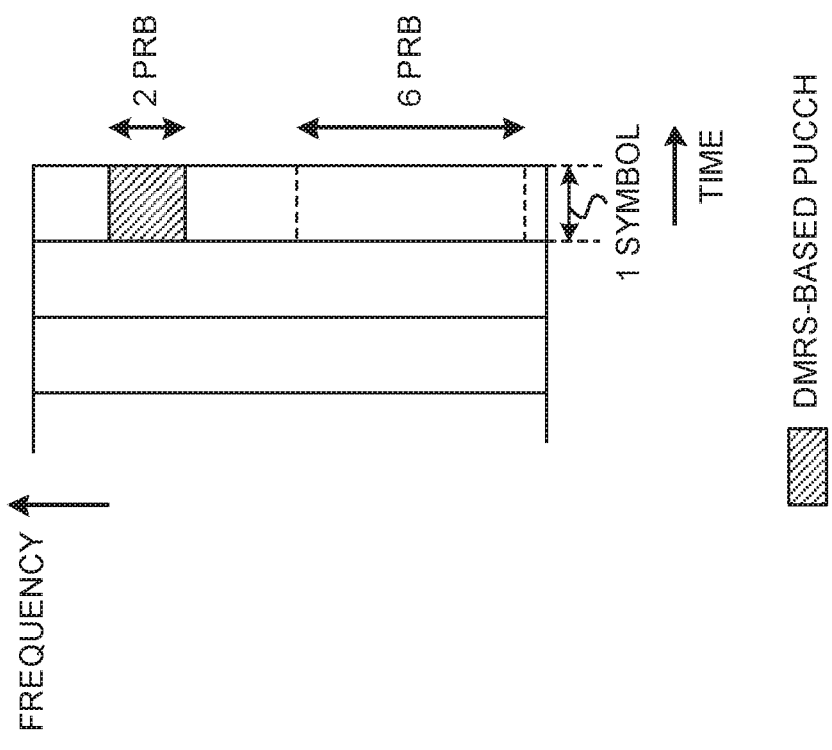

FIG. 9

| NUMBER OF PUCCH PRBS | NUMBER OF SUBCARRIERS | NUMBER OF Zadoff-Chu SEQUENCE | NUMBER OF ORTHOGONAL RESOURCES | |
|---|---|---|---|---|
| | | | WHEN MAXIMUM NUMBER OF PHASE ROTATION AMOUNTS ARE USED | WHEN NUMBER OF PHASE ROTATION AMOUNTS IS KEPT AT FIXED VALUE (HERE, 12) |
| 6 PRB | 6 × 12 = 72 | 71 − 1 = 70 | 70 × 72 = 5040 | 70 × 12 = 840 |
| 12 PRB | 12 × 12 = 144 | 139 − 1 = 138 | 138 × 144 = 19872 | 138 × 12 = 1656 |

FIG. 10

| NUMBER OF TRANSMITTING PRBS | NUMBER OF PHASE ROTATION AMOUNTS |
|---|---|
| 2 | 12 |
| 6 | 12 |
| 12 | 24 |
| 24 | 48 |

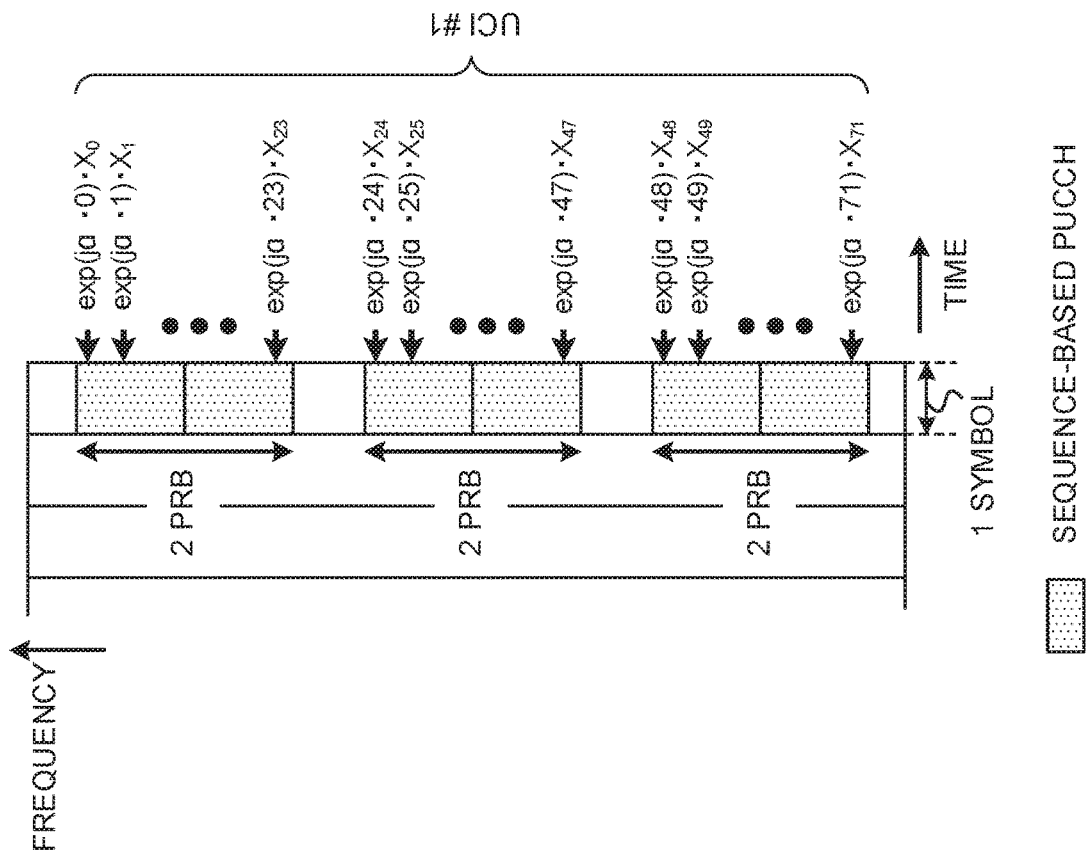
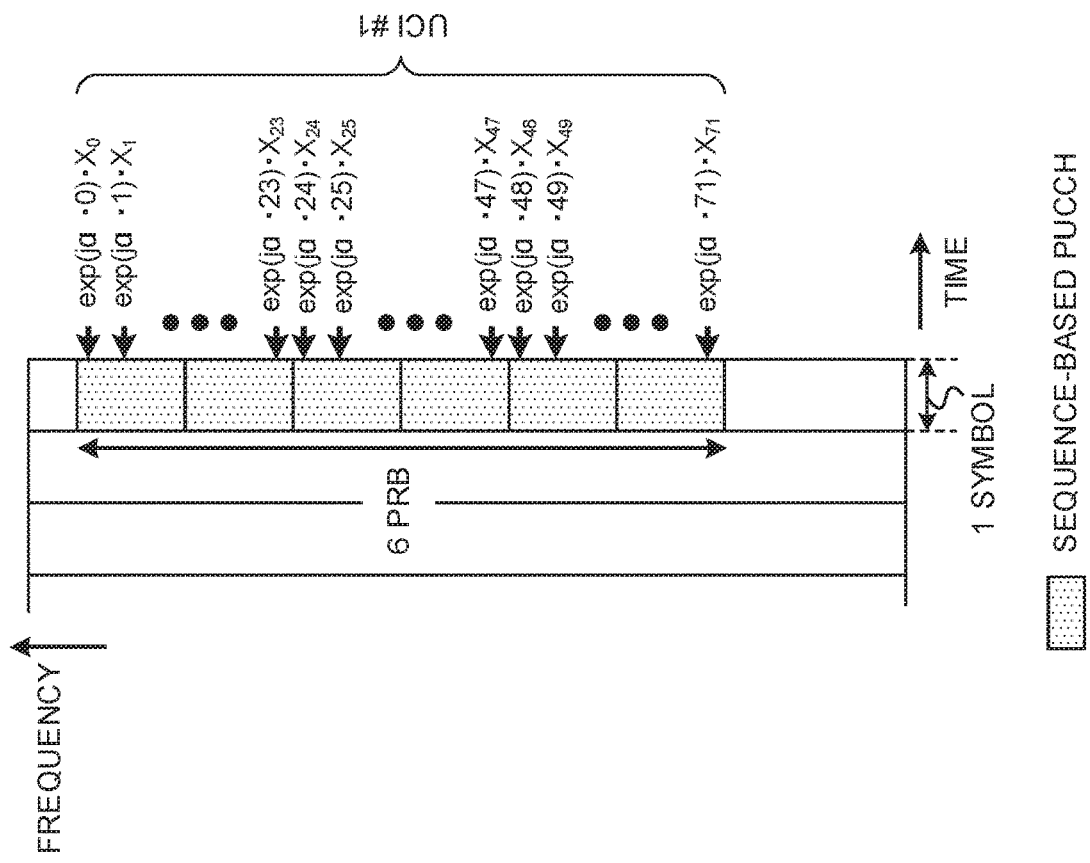

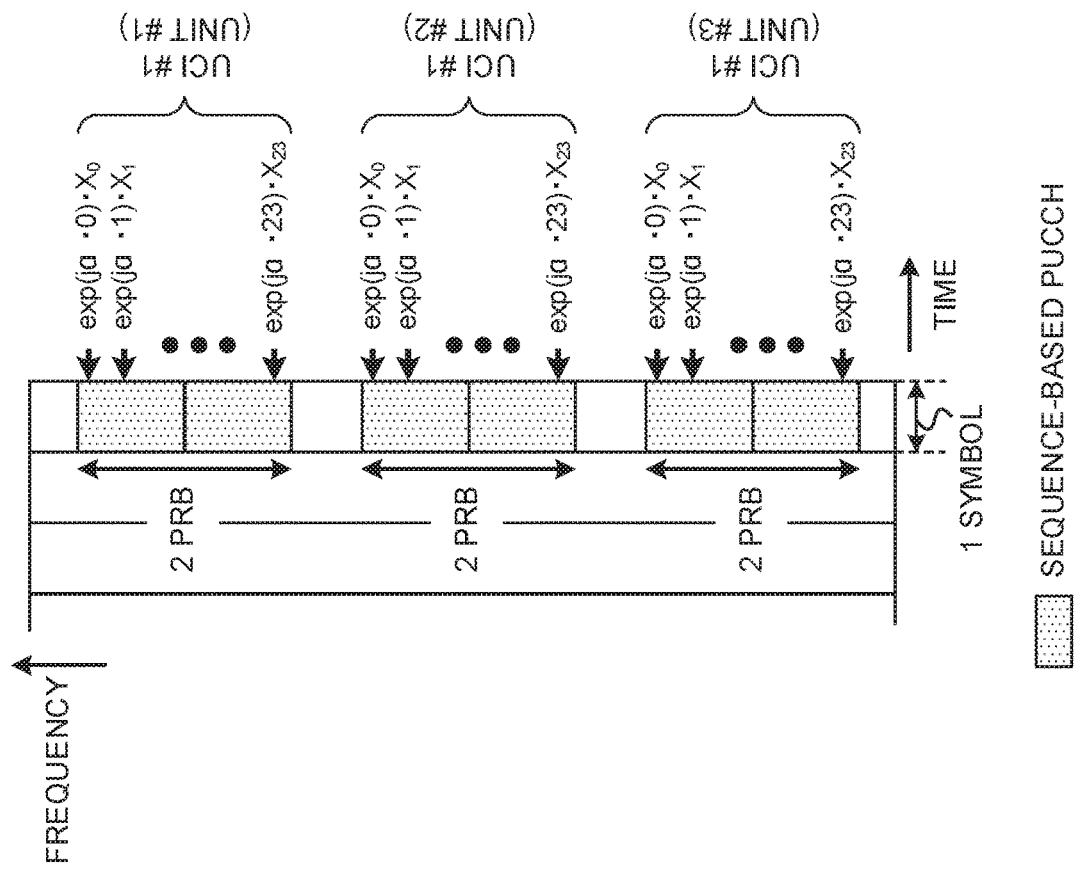
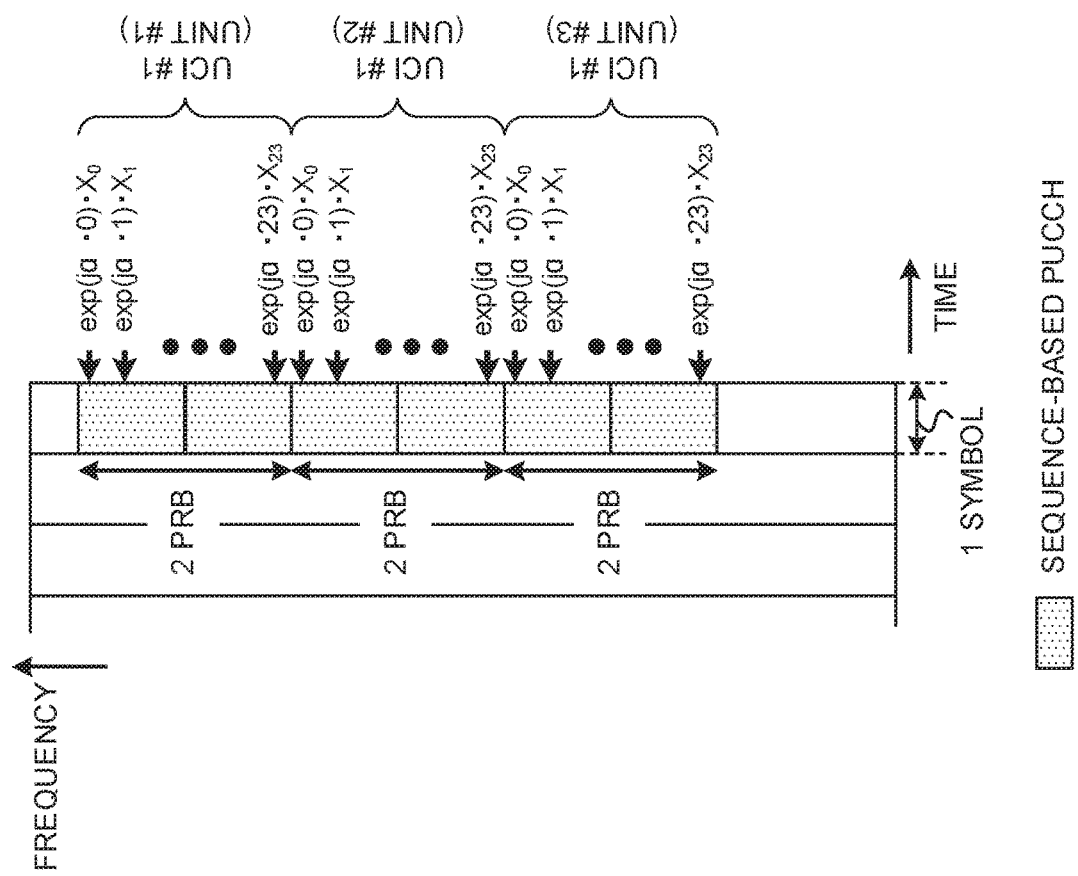

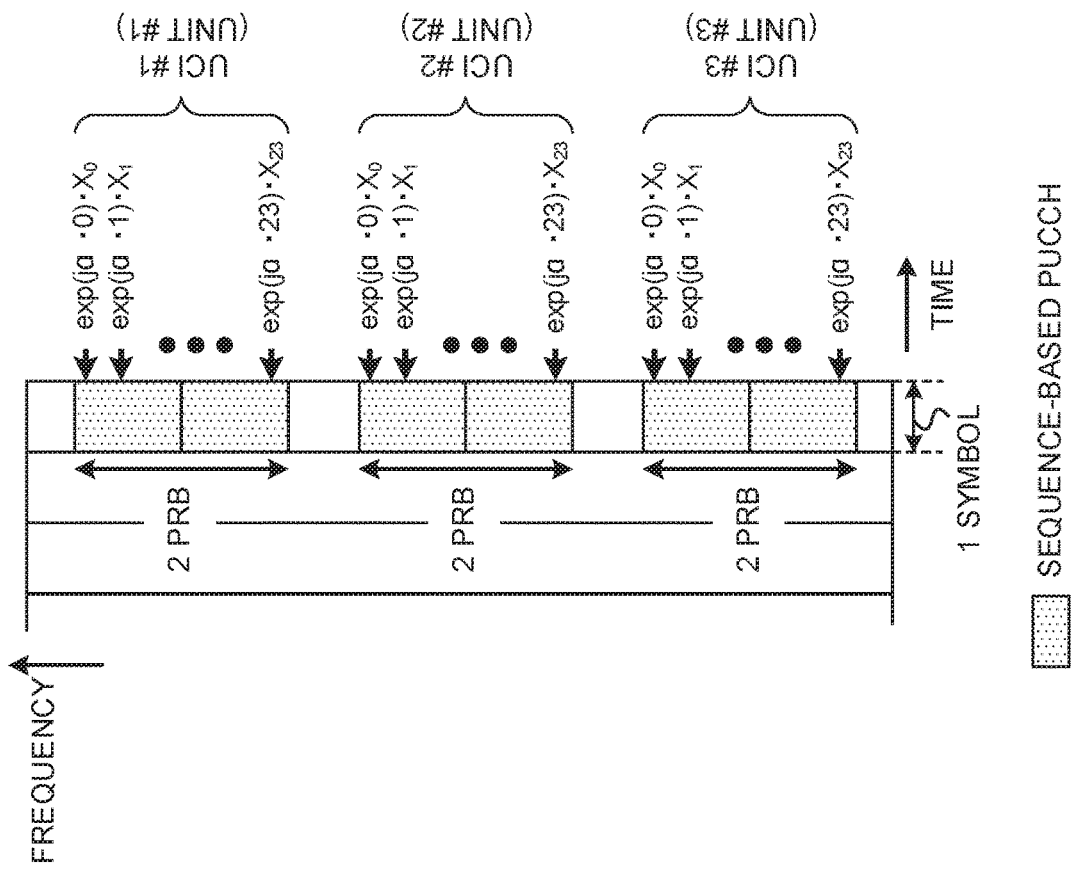
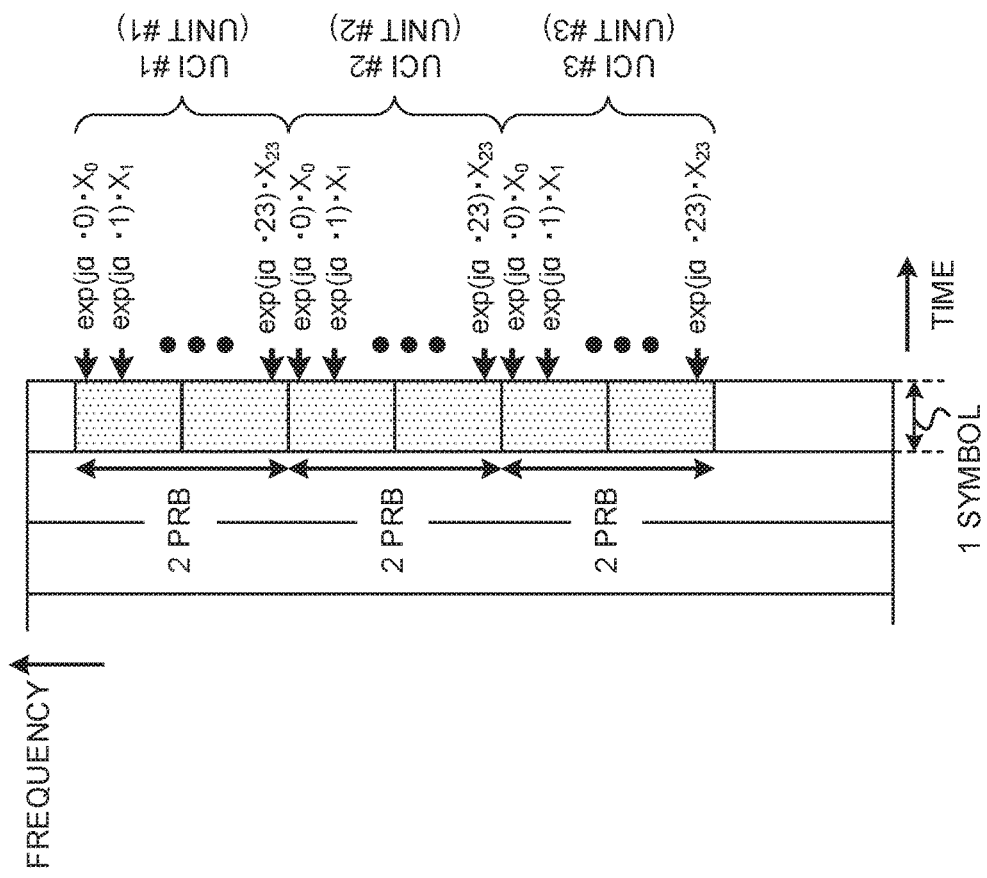
FIG. 13A
FIG. 13B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using uplink control channels (for example, PUCCH (Physical Uplink Control CHannel)) and/or uplink data channels (for example, PUSCH (Physical Uplink Shared CHannel)). The format of these uplink controls channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-ACKnowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Now, in LTE/NR, study is underway to use PUCCH (sequence-based PUCCH), not including demodulation reference signals (DMRSs) for UCI. However, if a base station to receive a sequence-based PUCCH receives a strong interference wave from a nearby cell that uses the same sequence and/or the same orthogonal resource, there is a possibility that the base station fails to detect UCI. In this case, there is a problem that a decline might be produced in communication throughput, spectral efficiency, etc.

The present invention has been made in view of the above, and it is therefore one of the objects of the present invention to provide a user terminal and a radio communication method that can report UCI properly even when a sequence-based PUCCH is used.

Solution to Problem

According to one aspect of the present invention, a user terminal has a control section that determines signals to transmit in a frequency resource for transmitting uplink control information, and a transmission section that transmits the signals in the frequency resource, and, when the signals include a signal sequence to use an orthogonal resource that is associated with the uplink control information, the control section assumes that a bandwidth of the frequency resource is equal to or greater than a predetermined bandwidth.

Advantageous Effects of Invention

According to the present invention, UCI can be reported properly even when a sequence-based PUCCH is used.

BRIEF DESCRIPTION OF DRAWINGS

FIGS. 4A and 4B are diagrams to show examples of sequence-based PUCCH generation processes;

FIGS. 6A and 6B are diagrams to show examples of frequency resources for a DMRS-based PUCCH and a sequence-based PUCCH, respectively;

FIG. 9 is a diagram to show an example of how the number of orthogonal resources changes when the limit on the maximum number of amounts of phase rotation and the transmission bandwidth of a sequence-based PUCCH are changed;

FIG. 10 is a diagram to show examples of associations between the number of PRBs for transmitting a sequence-based PUCCH and the number of amounts of phase rotation;

FIGS. 11A and 11B are diagrams to show examples of resource mapping for sequences having a sequence length to match the whole of the PUCCH bandwidth;

FIGS. 12A and 12B are diagrams to show examples of resource mapping in the event the same UCI is reported in a sequence-based PUCCH in a number of units;

FIGS. 13A and 13B are diagrams to show examples of resource mapping in the event a number of units report different UCIs using a sequence-based PUCCH;

DESCRIPTION OF EMBODIMENTS

Figure 1A:
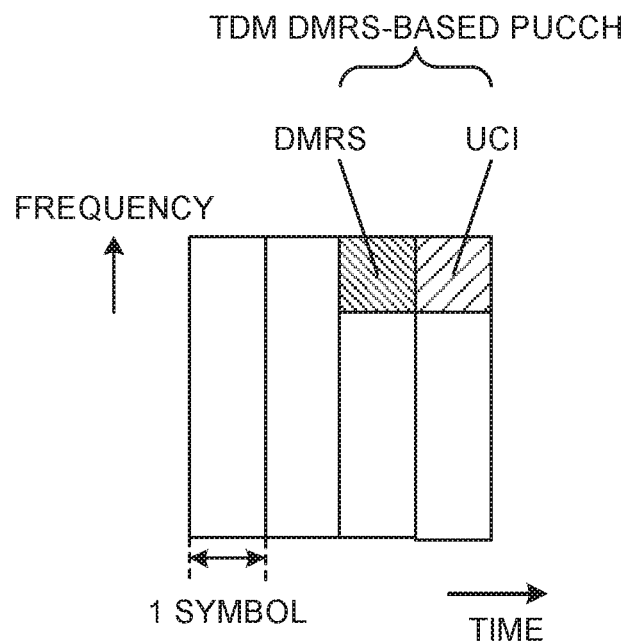
FIGS. 1A and 1B are diagrams to show examples of DMRS-based PUCCHs.

Future radio communication systems (for example, LTE Rel. 14, 15 and/or later versions, 5G, NR, etc.) are under study to introduce multiple numerologies, not a single numerology.

Here, a numerology may refer to a set of communication parameters that characterize the design of signals in a given RAT (Radio Access Technology), the design of a RAT and so on, and may include parameters that are defined with respect to the frequency direction and/or the time direction, such as subcarrier spacing (SCS), the length of symbols, the length of cyclic prefixes, the length of subframes, the length of transmission time intervals (TTIs) and so on. For example, future radio communication systems may support multiple SCS spacings such as 15 kHz, 30 kHz, 60 kHz, 120 kHz and 240 kHz.

Also, future radio communication systems are being studied to introduce time units (also referred to as "subframes," "slots," "minislots," "subslots," "TTIs," "short TTIs," "radio frames" and so on) that are the same as and/or different from those of existing LTE systems (LTE Rel. 13 or earlier versions), while supporting multiple numerologies and/or the like.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, 14 symbols), the transport blocks, the code blocks and/or the codewords of transmitting/receiving data can be transmitted and received in 1 or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a predetermined time duration (for example, 1 ms), irrespective of which numerology is used by (and/or configured in) the user terminal (for example, UE (User Equipment)).

On the other hand, slots may serve as a time unit that is based on the numerology used by the UE. For example, if the subcarrier spacing is 15 kHz or 30 kHz, the number of symbols per slot may be 7 or 14. When the subcarrier spacing is 60 kHz or greater, the number of symbols per slot may be 14. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than the PUCCH (Physical Uplink Control CHannel) formats of existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a predetermined number of symbols (for example, 1 symbol or 2 symbols) of a given SCS. In this short PUCCH, uplink control information (UCI) and a reference signal (RS) may be time-division-multiplexed (TDM (Time Division Multiplexing)) or frequency-division-multiplexed (FDM (Frequency Division Multiplexing)). The RS may be, for example, the demodulation reference signal (DMRS (DeModulation Reference Signal)), which is used to demodulate UCI.

The SCS in each symbol of the short PUCCH may be the same as or higher than the SCS in symbols for data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

A short PUCCH may be referred to as a "PUCCH with a higher (bigger, wider, etc.) SCS" (for example, 60 kHz). Note that the time unit in which 1 short PUCCH is transmitted may be referred to as a "short TTI."

In a short PUCCH, a multicarrier waveform (for example, a waveform based on cyclic prefix OFDM (CP-OFDM (Cyclic Prefix Orthogonal Frequency Division Multiplexing))) may be used, or a single-carrier waveform (for example, a waveform based on DFT-S-OFDM (Discrete Fourier Transform Spread Orthogonal Frequency Division Multiplexing) may be used.

Note that the waveform may be referred to as "communication scheme," "multiplexing scheme," "modulation scheme," "access scheme," "waveform scheme," and so on. Also, these waveforms may be characterized based on whether or not DFT precoding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." Furthermore, a "waveform" may also be referred to as "waveform signal," "signal in accordance with waveform," "waveform of signal," "signal," and so on.

Meanwhile, a long PUCCH is placed over a plurality of symbols in the slot so as to improve the coverage over the short PUCCH. In this long PUCCH, UCI and an RS (for example, the DMRS) may be time-division-multiplexed (TDM) or frequency-division-multiplexed (FDM). A long PUCCH may be referred to as a "PUCCH with a lower (smaller, narrower, etc.) SCS" (for example, 15 kHz). Note that the time unit in which 1 long PUCCH is transmitted may be referred to as a "long TTI."

Also, a long PUCCH may be comprised of a number of frequency resources to match a short PUCCH, or may be formed with a smaller number of frequency resources (for example, 1 or 2 physical resource blocks (PRBs)) than a short PUCCH, in order to achieve a power boosting effect. Also, a long PUCCH may be placed with a short PUCCH in the same slot.

For a long PUCCH, a single-carrier waveform (for example, DFT-s-OFDM waveform) may be used, or a multi-carrier waveform (for example, OFDM waveform) may be used. In addition, frequency hopping may be applied to a long PUCCH, per predetermined period within a slot (for example, per mini (sub) slot).

Note that a long PUCCH may be a PUCCH that is different from the PUCCHs stipulated in existing LTE systems (for example, LTE Rel. 8 to 13) (that is, a long PUCCH may be a PUCCH of a different format).

Hereinafter, a "PUCCH," when simply mentioned so, may be read as "a short PUCCH and/or a long PUCCH."

The PUCCH may be time-division-multiplexed (TDM) and/or frequency-division-multiplexed (FDM) with a UL data channel (hereinafter also referred to as "PUSCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

Now, envisaging NR, DMRS-based transmission and sequence-based transmission are under study as PUCCH transmission methods.

Since DMRS-based transmission reports UCI in an uplink control channel including the DMRS for demodulating UCI (hereinafter also referred to as "DMRS-based PUCCH"), DMRS-based transmission may be referred to as "coherent transmission," "coherent design," and so on.

Figure 1B:
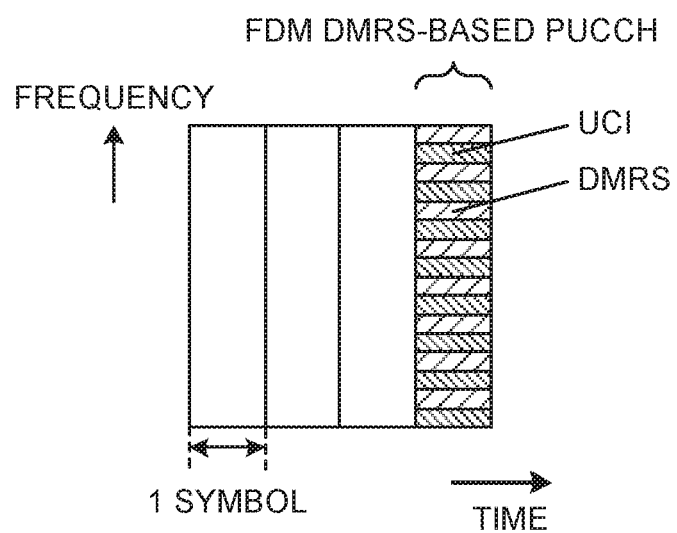

FIGS. 1A and 1B are diagrams to show examples of DMRS-based PUCCHs. A DMRS-based PUCCH may be formed by time-division-multiplexing (TDM) UCI and a DMRS, or may be formed by frequency-division-multiplexing (FDM) these.

In TDM DMRS-based PUCCH shown in FIG. 1A, a DMRS and UCI are mapped to different symbols (or short symbol). In the FDM DMRS-based PUCCH shown in FIG. 1B, a DMRS and UCI are mapped to different frequency resources (for example, subcarriers) within 1 symbol (or short symbol).

Since sequence-based transmission reports UCI in an uplink control channel including no DMRS for demodulating UCI (hereinafter also referred to as a "sequence-based PUCCH"), sequence-based transmission may be referred to as "non-coherent transmission," "non-coherent design," and the like.

UCI that is reported in non-coherent transmission (UCI based on non-coherent transmission) may be referred to as "RS w/o UCI" because it is detected by the network without requiring a DMRS.

In addition, UCI that is reported through non-coherent transmission may be reported by using the orthogonal resource that is used to transmit a predetermined RS (for example, the orthogonal code applied, the amount of sequence phase rotation, the time and/or frequency resource, etc.), and therefore this UCI may be referred to as "RS on UCI," "UCI-reporting RS," and the like.

A base sequence of a sequence-based PUCCH may be a CAZAC (Constant Amplitude Zero Auto-Correlation) sequence (for example, a Zadoff-Chu sequence), or may be a sequence conforming to a CAZAC sequence, such as one specified in 3GPP TS 36.211 § 5.5.1.2 (in particular, Table 5.5.1.2-1 and Table 5.5.1.2-2) and so on (CG-CAZAC (Computer-Generated CAZAC) sequence).

Information related to the base sequence may be configured (reported) from the network (for example, a radio base station) to a UE through higher layer signaling (for example, RRC (Radio Resource Control) signaling, MAC (Medium Access Control) signaling, broadcast information (the MIB (Master Information Block), SIBs (System Information Blocks), etc.) or physical layer signaling (for example, downlink control information (DCI)), or by combining these.

Information related to selection of CAZAC sequences, information about the amount of phase rotation to apply to CAZAC sequences, information about sequences conforming to CAZAC sequences (for example, information about the rows and/or columns in the above tables (information as to which row and/or column the value that is used corresponds)) and suchlike pieces of information may be reported to the UE.

Also, a number of prospective transmission resources for sequence-based transmission may be associated with a number of prospective values for the UCI that is reported, respectively. These transmission resources may be orthogonal resources (which may be referred to as "spreading code resources") that can be code-division-multiplexed (CDM). Note that the above-mentioned orthogonal resource may be at least one of a base sequence (orthogonal sequence), an amount of phase rotation, a cyclic shift (CS), and an orthogonal code (which may be referred to as, for example, an "OCC (Orthogonal Cover Code)").

Information to represent the above multiple prospective transmission resources may be reported from the network to the UE by higher layer signaling, physical layer signaling, or a combination of these. The UE may select 1 orthogonal resource from among a number of candidates depending on the value of the UCI to be reported, and transmit the sequence-based PUCCH using the selected resource.

Hereinafter, a case where the transmission resource for reporting UCI is the amount of phase rotation will be described. A number of prospective phase rotation amount assigned to 1 UE may be referred to as a "phase rotation amount set." Here, a case will be assumed where a sequence-based PUCCH is transmitted using 1 PRB (the number of subcarriers M is 12), but this is by no means limiting.

Figure 2A:
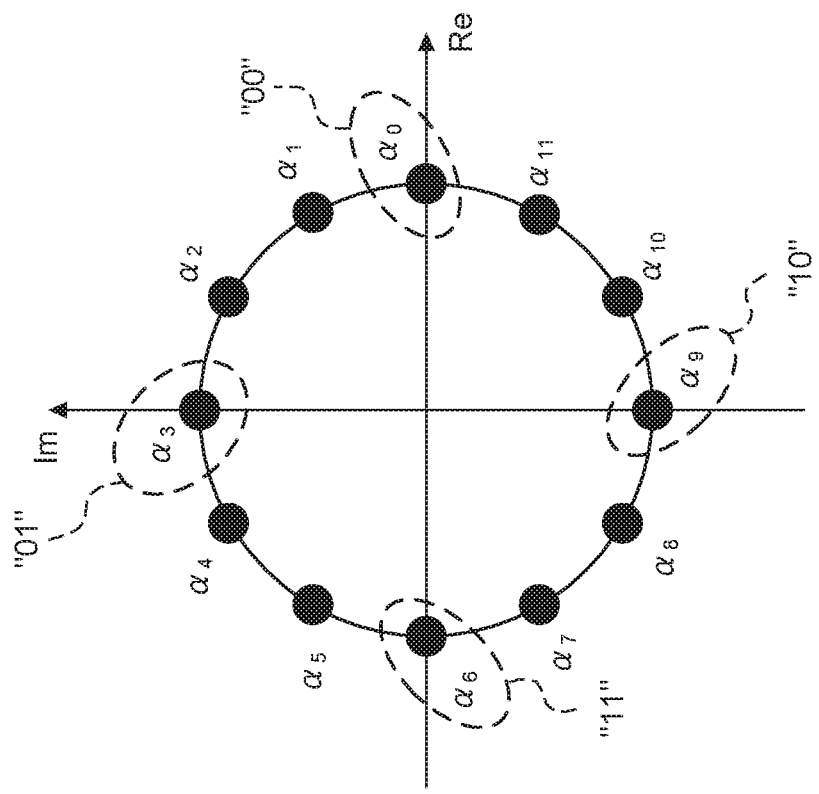
FIGS. 2A and 2B are diagrams to show examples of phase rotation amount sets.
Figure 2B:
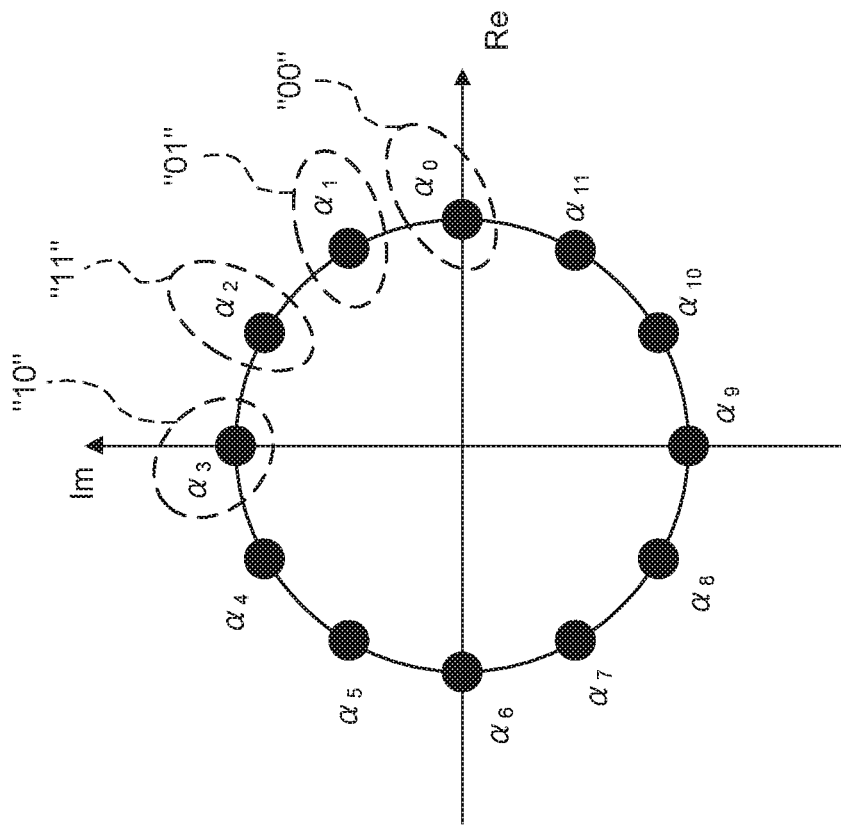

FIGS. 2A and 2B are diagrams to show examples of phase rotation amount sets. In this example, UCI is 2-bit information. Since 2-bit UCI takes 4 values, a phase rotation amount set includes 4 phase rotation amounts.

The sequence length of the base sequence for use for a sequence-based PUCCH is determined by the number of subcarriers M and the number of PRBs. In this case, since 1 PRB is assumed, when this base sequence is a Zadoff-Chu sequence, the sequence length is 10, which is the largest prime number less than or equal to 12 (in this case, 11) minus 1, and so 12 amounts of phase rotation are available for use. For example, 12 phase rotation amounts $\alpha_0$-$\alpha_{11}$ provided at phase intervals of $2\pi/12$ may be defined.

The 12 sequences obtained by phase-rotating the base sequence by phase rotation (cyclic shift) amounts $\alpha_0$ to $\alpha_{11}$ are orthogonal to each other. Note that phase rotation amounts $\alpha_0$ to $\alpha_{11}$ may be defined based on at least one of the number of subcarriers, M, the number of PRBs and the sequence length of the base sequence. A set of phase rotation amounts may be comprised of two or more phase rotation amounts selected from phase rotation amounts $\alpha_0$ to $\alpha_{11}$.

The set of phase rotation amounts for sequence type 0 shown in FIG. 2A is comprised of a number of neighboring (contiguous) phase rotation amounts. The set of phase rotation amounts includes 4 phase rotation amounts $\alpha_0$, $\alpha_1$, $\alpha_2$, and $\alpha_3$, each separated by $\pi/6$. The set of phase rotation amounts for sequence type 1 shown in FIG. 2B is comprised of a number of phase rotation amounts that are spaced apart from each other. This set of phase rotation amounts includes 4 phase rotation amounts $\alpha_0$, $\alpha_3$, $\alpha_6$, and $\alpha_9$ apart from each other by $\pi/2$.

In an environment with low frequency selectivity, the cross correlation between sequence type 0 and sequence type 1 is little (there is no interference between sequences generated in each sequence type). Therefore, in an environment with low frequency selectivity, the UCI error rate is equal for both sequence type 0 and sequence type 1. If sequence type 0 is used, 12 phase rotation amounts can be provided more densely, so that 3 UEs can each use 4 phase rotation amounts, allowing more efficient use of phase rotation amounts.

On the other hand, in an environment with strong frequency selectivity, since the cross correlation between sequences generated by applying adjacent phase rotation amounts is significant, and the UCI error of UCI increases. Therefore, when the frequency selectivity is strong, using sequence type 1 can lower the UCI error rate compared to using sequence type 0.

The UE may assume using sequence type 0 if the transmission bandwidth allocated to a PUCCH is equal to or greater than a predetermined value, and select sequence type 1 if the transmission bandwidth allocated to a PUCCH is less than the predetermined value. Thus, without reporting the sequence type from the network, the UE can select a sequence type that satisfies a predetermined error rate.

Now, assume the case where, when the transmission bandwidth is greater, more amounts of phase rotation will be available, but not all of them are used. For example, the number of amounts of phase rotation that can be used is limited to 12, regardless of the transmission bandwidth. When the transmission bandwidth is formed with 6 PRBs, 72 (=12×6) amounts of phase rotation are available, but only 12 amounts of phase rotation are used out of these. In this case, even if sequence type (0) is used, each amount of phase rotation used is 6 amounts of phase rotation apart from one another, and therefore sequences that are generated based on neighboring amounts of phase rotation in these 12 amounts of phase rotation are little cross-correlated.

Figure 3:
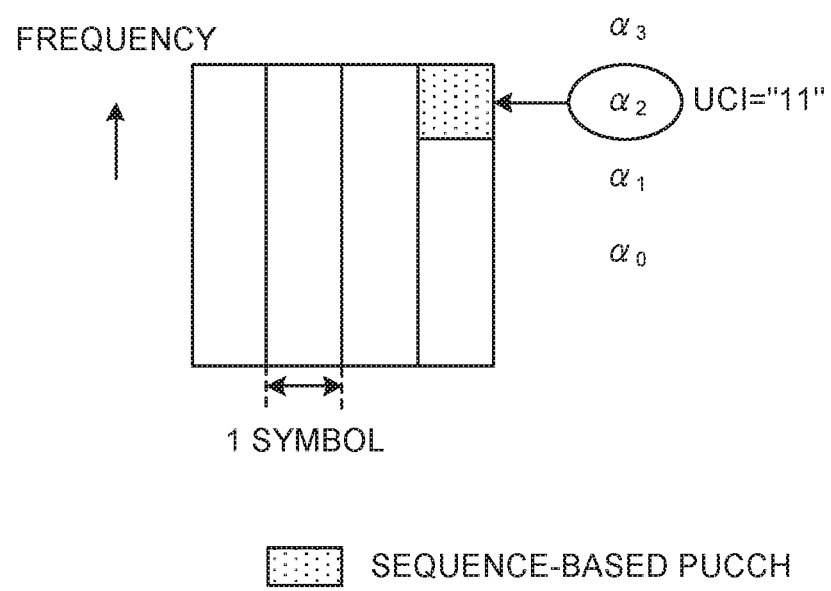
FIG. 3 is a diagram to show an example of a sequence-based PUCCH.

FIG. 3 is a diagram to show an example of a sequence-based PUCCH. As shown in FIG. 3, when a UE, to which the set of phase rotation amounts of FIG. 2A is assigned, selects "11" as 2-bit UCI to report, the reference sequence is phase-rotated using corresponding $\alpha_2$, to generate a sequence-based PUCCH.

FIGS. 4A and 4B are diagrams to show examples of sequence-based PUCCH generation processes. The UE applies phase rotation to base sequences $X_0$-$X_{M-1}$ of sequence length M according to phase rotation amount a that is selected, and performs OFDM or DFT-S-OFDM processing on these phase-rotated base sequences. The UE transmits the output signals having been subjected to OFDM or DFT-S-OFDM processing (FIG. 4A).

FIG. 4B is a diagram to show an example of resource mapping of sequence-based PUCCHs. If a sequence-based PUCCH is transmitted using 1 PRB (the number of subcarriers M is 12) in a given symbol (for example, 1 symbol), base sequences $X_0$-$X_{M-1}$ are phase-rotated using phase rotation amounts $\alpha$ associated with predetermined information, and each base sequence is mapped to subcarriers in this 1 PRB. Note that the base sequences may be used with some of the base sequences reused or expanded.

Note that, for example, when the set of phase rotation amounts in FIG. 2A is assigned to the UE, $\alpha$ is one of $\alpha_0$, $\alpha_1$, $\alpha_2$ and $\alpha_3$, selected according to UCI. Similarly, hereinafter, $\alpha$ in the drawings represents any one amount of phase rotation that the UE is allowed to select.

Figure 5A:
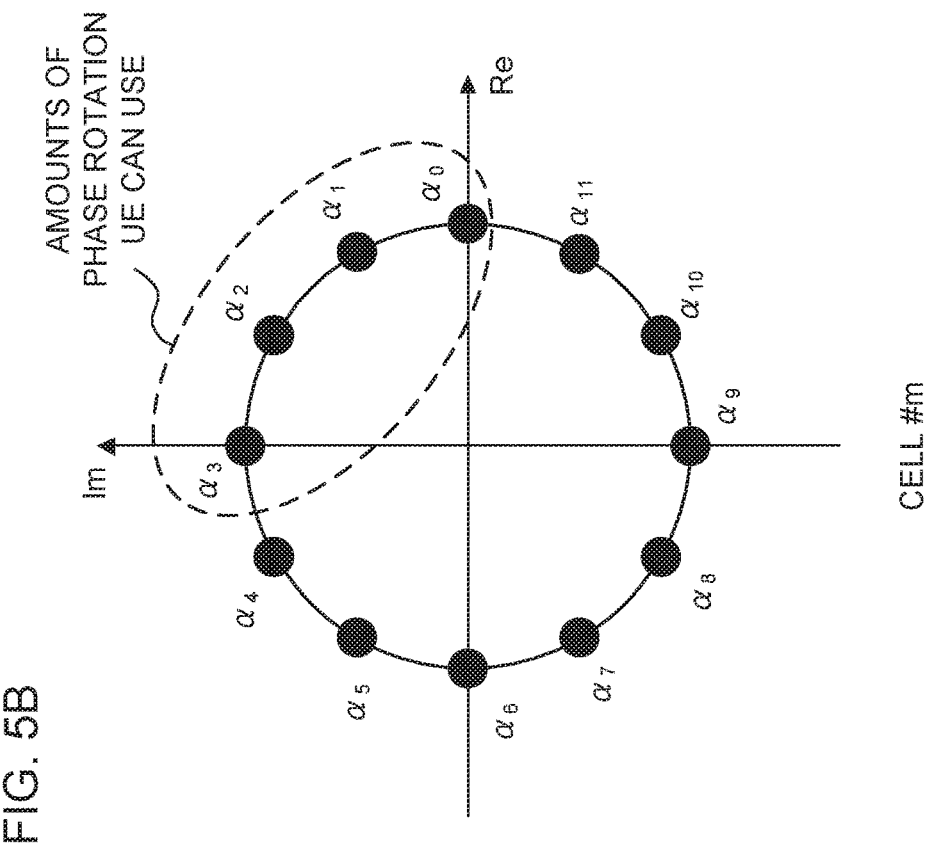
FIGS. 5A and 5B are diagrams to show examples of using the same amount of phase rotation for sequence-based PUCCH in a number of cells.
Figure 5B:
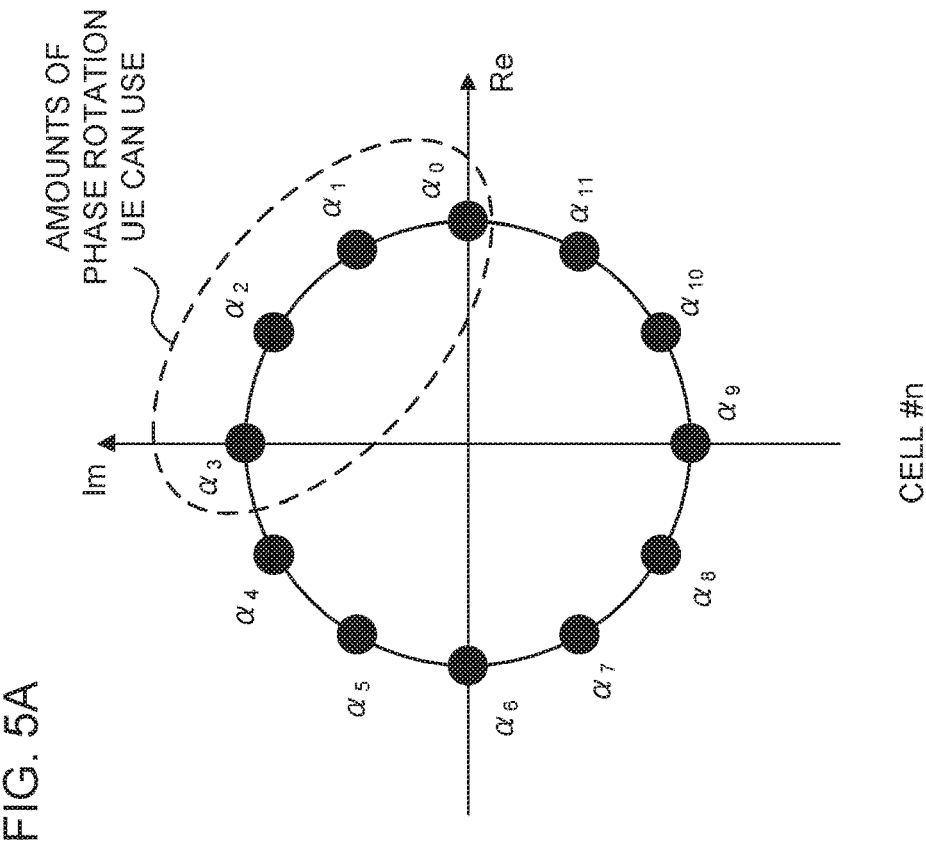

Now, when a sequence-based PUCCH such as one described above is used in a number of cells, the same sequence and/or the same orthogonal resource (for example, the same amount of phase rotation) can be used between neighboring cells. FIGS. 5A and 5B are diagrams to show examples of using the same amount of phase rotation for sequence-based PUCCH in a number of cells. FIG. 5A shows an example of the amount of phase rotation used in cell #n, and FIG. 5B shows examples of amounts of phase rotation for use in cell #m (m≠n). In either cell, the UE is configured to be able to use phase rotation amounts $\alpha_0$ to $\alpha_3$.

However, if a base station to receive a sequence-based PUCCH receives a strong interference wave from a nearby cell that uses the same sequence and/or the same orthogonal resource, there is a possibility that the base station fails to detect UCI. In this case, there is a problem that a decline might be produced in communication throughput, spectral efficiency, etc.

So, the present inventors have worked on a method for reporting UCI properly even when a sequence-based PUCCH is used, and arrived at the present invention. According to an example of the present invention, it is possible to prevent interference from being produced with respect to a sequence-based PUCCH, and reduce the impact of interference when it is produced.

Now, embodiments of the present invention will be described below in detail with reference to the accompanying drawings. Note that the radio communication methods according to each embodiment may be applied individually or may be applied in combination.

Note that, in this specification, a "symbol (symbol location)" might mean a "symbol (symbol location)" that assumes a predetermined numerology (for example, SCS of a predetermined value) (time resource). Also, in this specification, a "cell" may be interpreted as being a "component carrier (CC)," a "carrier," a "site," and a "beam."

Note that, although cases where sequence-based UCI is generated by applying phase rotation to a base sequence will be primarily described, this is by no means limiting. The "amount of phase rotation" may be replaced with an "orthogonal resource," "other orthogonal resource" (for example, "orthogonal code," "orthogonal sequence," "cyclic shift," "time and/or frequency resource," etc.), and the like.

(Radio Communication Method)

According to one embodiment of the present invention, the frequency resource (frequency bandwidth) for a sequence-based PUCCH is limited to a predetermined bandwidth or more. In this case, when a UE transmits a sequence-based PUCCH, the UE can assume that the frequency resource (transmission bandwidth) to use to transmit this PUCCH is equal to or greater than a predetermined bandwidth.

For example, the UE can assume that a number of PRBs equal to or greater than a predetermined threshold X may be available for the transmission bandwidth for the sequence-based PUCCH. X may be, for example, 2, 4, 6, 8, 10, 12, etc., or may be a number larger than 12.

By increasing the transmission bandwidth (the number of PRBs), it is possible to increase the number of orthogonal resources for the PUCCH (for example, orthogonal codes, orthogonal sequences, amounts of phase rotation and cyclic shifts). Also, if the number of orthogonal resources increases, different orthogonal resources can be used between nearby cells (for example, hopping orthogonal resources in a predetermined cycle), thereby preventing nearby cells from using the same orthogonal resource, so that interference can be suitably reduced. In the event there are a large number of orthogonal resources, even if the same orthogonal resource is used in a number of cells, the physical distance between these cells can be expanded, and interference can be reduced.

For example, when transmitting a sequence-based PUCCH having a frequency bandwidth of 6 PRBs (=6*12=72 subcarriers), the number of Zadoff-Chu sequences that are available for use is 70, which is the largest prime number less than or equal to 72 (in this case, 71) minus 1, and so 72 amounts of phase rotation are available for use. In this case, up to 5040 (=70*72) orthogonal resources can be used.

Note that, assuming that a sequence-based PUCCH having a frequency bandwidth of 1 PRB (=12 subcarriers) is transmitted, the number of Zadoff-Chu sequences that are available for use is 10, which is the largest prime number less than or equal to 12 (in this case, 1) minus 1. In this case, up to 120 (=10*12) orthogonal resources can be used. When CG-CAZAC sequences are used instead of Zadoff-Chu sequences, given that the number of sequences is 30, up to 360 (=30*12) orthogonal resources can be used.

From the above, it is ensured that many orthogonal resources can be used to transmit a sequence-based PUCCH if the above X is set to 6, for example.

The first embodiment might assume that a UE can transmit a sequence-based PUCCH in a bandwidth equal to or larger than a predetermined bandwidth, and transmit a DMRS-based PUCCH in a band less than the predetermined bandwidth. For example, if different frequency resources (bands) are allocated to the UE for a sequence-based PUCCH and a DMRS-based PUCCH, the UE may decide in which band the PUCCH should be transmitted, based on information reported from the network (for example, a base station).

For example, the information for making the above decision may be information about the resources allocated (for example, the numbers of PRBs), information to specifying one of the sequence-based PUCCH and the DMRS-based PUCCH, or information about a predetermined bandwidth (for example, the number of PRBs (X in the above description)) that serves as the lower limit for the frequency bandwidth of the sequence-based PUCCH (the upper limit for the frequency bandwidth of a DMRS-based PUCCH).

Also, the information for making the above decision may be reported to the UE by using higher layer signaling (for example, RRC signaling, broadcast information, etc.), physical layer signaling (example, DCI), or by a combination of these.

Based on the number of PRBs reported, the UE may decide whether to transmit UCI by using the sequence-based PUCCH or by using the DMRS-based PUCCH. Also, if the network reports that the sequence-based PUCCH uses the first bandwidth (for example, Y PRBs) and the DMRS-based PUCCH uses a second bandwidth (for example, X PRBs), the UE may further determine the number of PRBs for transmitting the PUCCH based on information specifying one of the sequence-based PUCCH and the DMRS-based PUCCH.

FIGS. 6A and 6B are diagrams to show examples of frequency resources for a DMRS-based PUCCH and a sequence-based PUCCH, respectively. For example, when transmission of a DMRS-based PUCCH transmission is reported (configured, indicated, etc.), the UE may transmit a DMRS-based PUCCH by using 2 PRBs of frequency resources, as shown in FIG. 6A. Also, when transmission of a sequence-based PUCCH is reported (configured, indicated, etc.), the UE may transmit a sequence-based PUCCH by 6 PRBs of frequency resources, as shown in FIG. 6B.

When it is reported that the lower limit for the frequency bandwidth of the sequence-based PUCCH is, for example, 6 PRBs, and, furthermore, it is reported that the transmission bandwidth of a PUCCH is 2 PRBs, the UE may transmit a DMRS-based PUCCH by using 2 PRBs of frequency resources shown in FIG. 6A. Furthermore, when the lower limit for the frequency bandwidth of the sequence-based PUCCH is reported to be, for example, 6 PRBs, and, furthermore, the transmission bandwidth of a PUCCH is reported to be 6 PRBs, the UE may transmit a sequence-based PUCCH using 6 PRBs of frequency resources shown in FIG. 6B.

[Maximum Number of Orthogonal Resources that can be Used]

Regarding the transmission bandwidth of a sequence-based PUCCH, the UE may assume that that UE can use all of the orthogonal resources that are available for use, or can use only part of these. For example, the maximum number N of orthogonal resources (for example, amount of phase rotation) that can be used may be configured from the network to the UE.

The UE may assume that information about the PUCCH type is reported in higher layer signaling (for example, RRC signaling, broadcast information, etc.), physical layer signaling (for example, DCI), or a combination of these. For example, prospective maximum numbers of orthogonal resources may be reported to the UE via higher layer signaling, and one of these prospective maximum numbers may be specified by physical layer signaling.

For ease of explanation, the following description will assume that the transmission bandwidth of a PUCCH is A PRBs, and the number of subcarriers per PRB is M. When all the amounts of phase rotation (=A*M) that are available for use are used, the number of amounts of phase rotation can be used, so that cell capacity (the number of UEs to multiplex) can be improved. Also, in the event A*M amounts of phase rotation are available for use and the number of amounts of phrase rotation for use is limited to N (<A*M) even when the frequency selectivity is severe (strong), the error rate of UCI can be lowered.

Figure 7A:
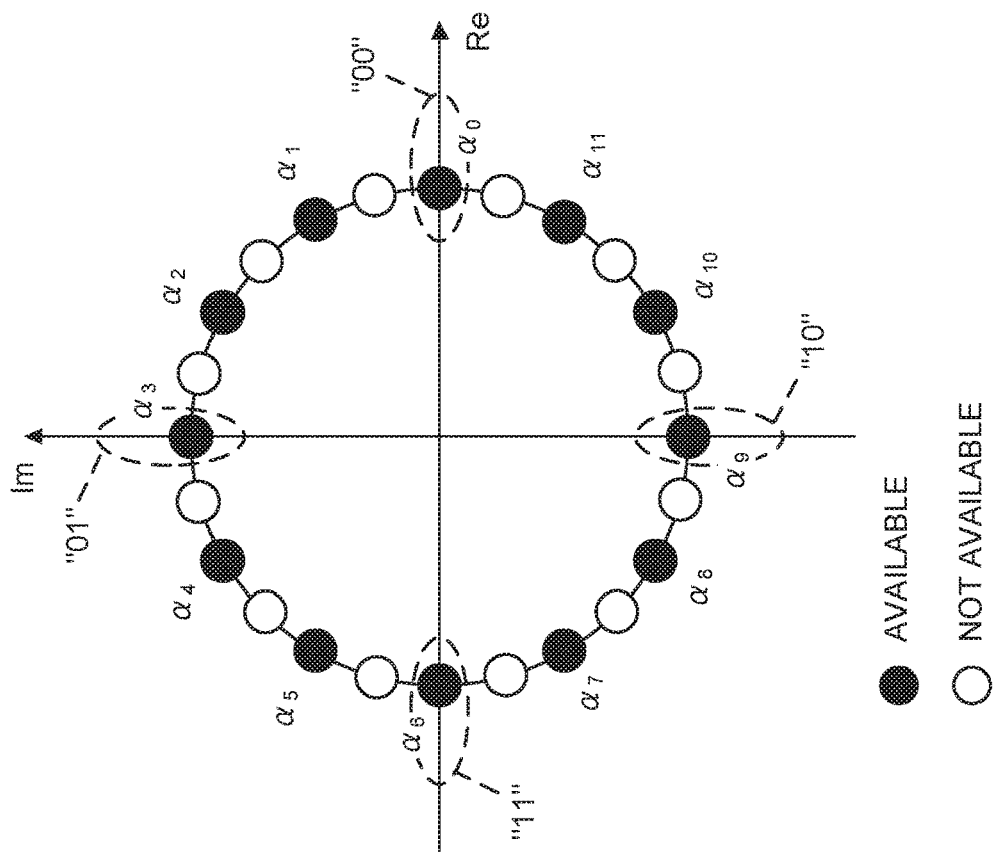
FIGS. 7A and 7B are diagrams to show examples in which the maximum number of amounts of phase rotation that can be used is limited.
Figure 7B:
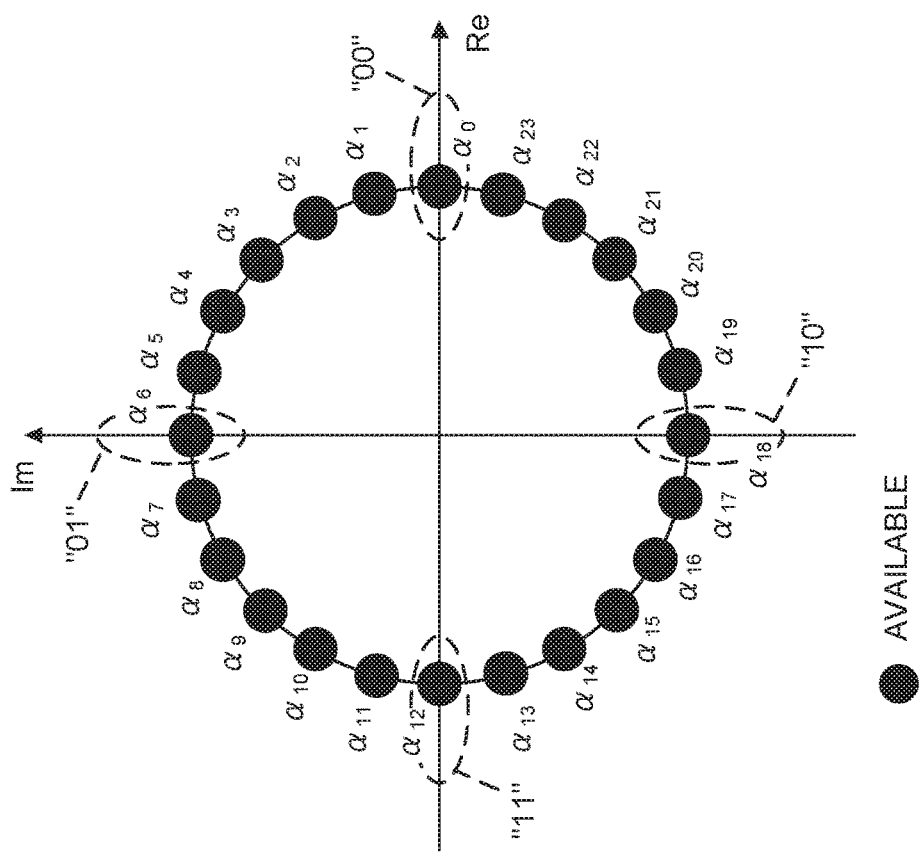

FIGS. 7A and 7B are diagrams to show examples in which the maximum number of amounts of phase rotation that can be used is limited. In this case, cases of A=2 and M=12 will be illustrated as examples, but this is by no means limiting.

FIG. 7A shows an example in which all orthogonal resources can be used in the event 2 PRBs are used. 24 (=2*12) amounts of phase rotation can be used, so that for example, phase rotation amounts $\alpha_0$ to $\alpha_{23}$ at phase intervals of $2\pi/24$ can be defined. FIG. 7A shows 4 phase rotation amounts $\alpha_0$, $\alpha_6$, $\alpha_{12}$, and $\alpha_{18}$ (corresponding to information "00," "01," "11," and "10," respectively), each $\pi/2$ apart, as an example of a set of phase rotation amounts to be configured in a UE.

FIG. 7B shows examples of orthogonal resources that can be used when 2 PRBs are used and N is limited to 12. 12 amounts of phase rotation can be used, so that for example, among the 24 phase rotation amounts $\alpha_0$ to $\alpha_{23}$ shown in FIG. 7A, the phase rotation amounts that correspond to even-numbered indices (that is, 12 phase rotation amounts $\alpha_0$ to $\alpha_{11}$ at phase intervals of $2\pi/12$) may be judged available for use. FIG. 7A shows 4 phase rotation amounts $\alpha_0$, $\alpha_6$, $\alpha_{12}$, and $\alpha_{18}$ (corresponding to information "00," "01," "11," and "10," respectively), each $\pi/2$ apart, as an example of a set of phase rotation amounts to be configured in a UE.

[Transmission Bandwidth of Sequence-Based PUCCH]

The transmission bandwidth of a sequence-based PUCCH can take multiple values. By allocating resources efficiently based on the conditions of cells (for example, channel states, the quality, the degree of congestion, and so forth), it is possible to realize a trade-off between the capacity of cell capacity and spectral efficiency.

For example, information about the transmission bandwidth of a sequence-based PUCCH may be reported by using higher layer signaling, physical layer signaling, or a combination of these. Prospective transmission bandwidths of a sequence-based PUCCH may be reported to the UE via higher layer signaling (such as broadcast information), and one of these prospective transmission bandwidths may be specified by separate higher layer signaling or physical layer signaling.

Figure 8A:
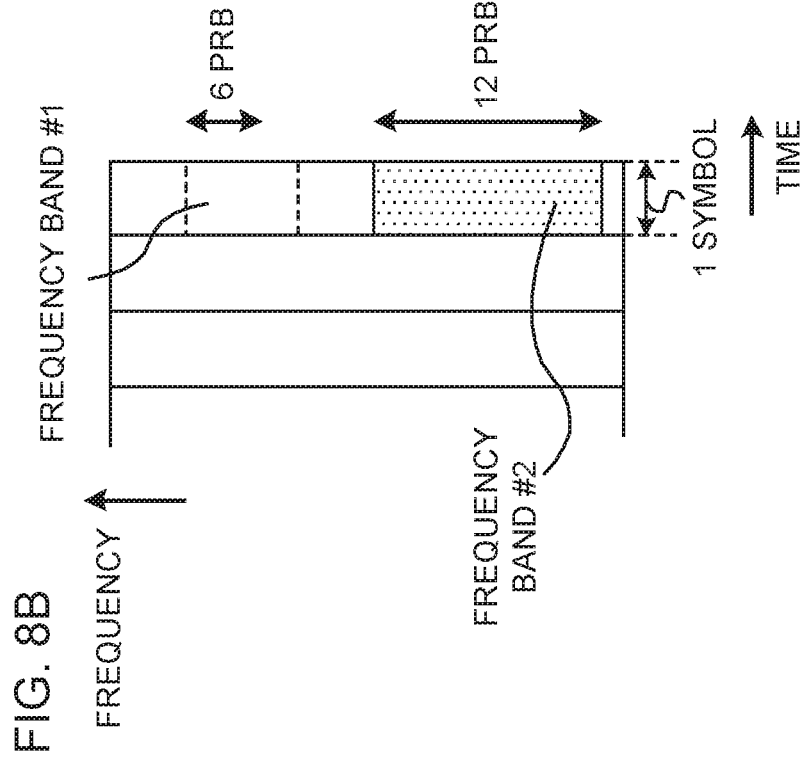
FIGS. 8A and 8B are diagrams to show examples of sequence-based PUCCH transmission bandwidths.
Figure 8B:
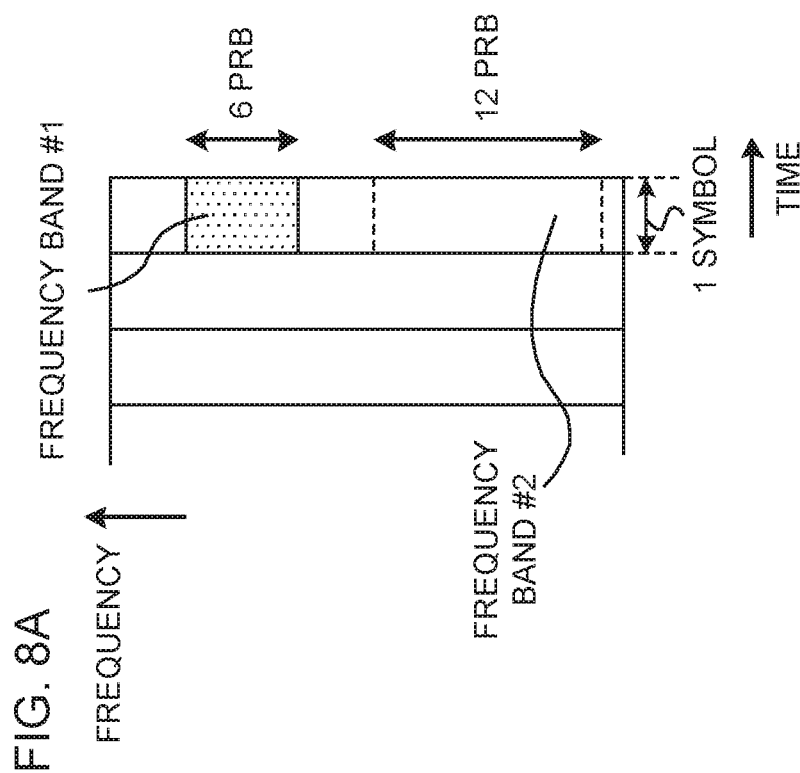

FIGS. 8A and 8B are diagrams to show examples of sequence-based PUCCH transmission bandwidths. In these examples, the 2 bands of frequency band #1 (6 PRBs) and frequency band #2 (12 PRBs) can be configured in a UE. As shown in FIG. 8A, when the PUCCH transmission bandwidth for the UE is configured small (when frequency band #1 is selected), the frequency resources to use for UCI transmission can be reduced, and therefore limited frequency resources can be used efficiently.

On the other hand, as shown in FIG. 8B, when the PUCCH transmission bandwidth for the UE is configured large (when frequency band #2 is selected), in cells in which the frequency selectivity is not severe (for example, cells with narrow coverage), cells in which high frequency bandwidths are used, and so on, the orthogonality between these amounts of phase rotation is not lost (interference is not produced) even if A*M or fewer amounts of phase rotation are used, so that by using A*M or fewer amount of phase rotation, the number of UEs to multiplex can be increased, and cell capacity can be increased (frequency resources can be used efficiently).

[Relationship Between Maximum Number of Orthogonal Resources and Transmission Bandwidth of Sequence-Based PUCCH]

FIG. 9 is a diagram to show an example of how the number of orthogonal resources changes when the limit on the maximum number of amounts of phase rotation and the transmission bandwidth of a sequence-based PUCCH are changed. In this example, the number of subcarriers per PRB is M=12.

When the PUCCH bandwidth is 6 PRBs, given that the number of subcarriers included in this bandwidth is 72 and the number of Zadoff-Chu sequences is 70, 5040 (=70*72) orthogonal resources can be used if all the amounts of phase rotation (=72) can be used. Meanwhile, when the maximum number of amounts of phase rotation is limited to a fixed value N (here, 12), 840 (=70*12) orthogonal resources can be used.

Similarly, when the PUCCH bandwidth is 12 PRBs, given that the number of subcarriers included in this bandwidth is 144 and the number of Zadoff-Chu sequences is 138, 19872 (=138*144) orthogonal resources can be used if all the amounts of phase rotation (=144) can be used. Meanwhile, when the maximum number of amounts of phase rotation is limited to a fixed value N (here, 12), 1656 (=138*12) orthogonal resources can be used.

As can be seen from these, by broadening the bandwidth and increasing the number of amounts of phase rotation available for use, the number of orthogonal resources can be increased significantly. Also, when the amount of phase rotation is limited to a fixed value, the number of orthogonal resources is doubled or less (broadening the band is of little effect) even if twice the bandwidth is used.

Note that the number of orthogonal resources may be associated with the transmission bandwidth of a sequence-based PUCCH. For example, information related to the association between prospective transmission bandwidth for the sequence-based PUCCH and the number of orthogonal resources for each prospective transmission bandwidth may be reported to the UE. Information about this association may be reported using higher layer signaling, physical layer signaling, or a combination of these.

Information about this association may be reported to the UE by higher layer signaling (such as broadcast information), and information related to the transmission bandwidth of the PUCCH may be reported by different higher layer signaling or physical layer signaling. In this case, the UE can learn the number of orthogonal resources based on the transmission bandwidth of the sequence-based PUCCH. It is possible to reduce the amount of information that needs to be reported, rather than reporting the number of orthogonal resources and the transmission bandwidth for the sequence-based PUCCH separately, so that the efficiency of downlink communication can be improved.

FIG. 10 is a diagram to show examples of associations between the number of PRBs for transmitting a sequence-based PUCCH and the number of amounts of phase rotation. In this example, the numbers of amounts of phase rotation=12, 12, 24 and 48 are configured in association with the numbers of PRBs to be transmitted=2, 6, 12 and 24, respectively.

[Resource Mapping for Sequence]

Resource mapping for a sequence-based PUCCH will be described. A sequence-based PUCCH may be mapped to contiguous frequency resources that match the transmission bandwidth, or mapped to a number of non-contiguous frequency resources that in sum amount to the transmission bandwidth. In the latter case, the sequence-based PUCCH is transmitted in distributed frequency bandwidths, so that an improved UCI error rate can be expected by virtue of a frequency diversity effect.

Frequency resources for the PUCCH may be formed by one or more predetermined frequency units (for example, subcarriers, PRBs, etc.). Information about PUCCH resources may be reported to a UE. For example, this PUCCH resource information may indicate the starting position of frequency resources, the bandwidth of frequency resources, and the cycle of frequency resources, and so on.

The UE specifies the PUCCH resource to use based on the information about PUCCH resources. When 1 frequency resource is reported, the UE may specify other frequency resources based on a predetermined rule. For example, if a PRB index #n is reported as 1 frequency resource, the UE can assume the use of [n, n+1, n+4, n+5, n+8, and n+9] (3 resources, each comprised of 2-PRB units, are used at 4-PRB intervals). Similar predetermined rules may be configured by higher layer signaling (for example, RRC signaling), or may be specified in advance by the specification.

Also, for all of the PUCCH resources that are allocated, (a) 1 UCI may be transmitted, or (b) a number of UCIs may be transmitted. Here, a number of UCIs mentioned in (b) above may correspond to the same information, or correspond to different pieces of information. Note that 1 UCI and/or multiple UCIs may be mapped to contiguous frequency resources, or mapped to a number of non-contiguous frequency resources, as described above.

That is, 1 UCI may be mapped to a number of frequency resources by using at least one of spreading, repetition and coding. When UCI is spread over the band and transmitted, the UCI error rate is can be expected to improve by virtue of the spreading gain.

In the mapping method based on (a) above, a sequence length to match (or proportional to) all frequency resources may be used. In this case, if the transmission bandwidth of the PUCCH is A PRBs and the number of subcarriers in a PRB is M, the UE generates A*M base sequences of $X_0$, $X_1, \ldots, X_{A*M-1}$ (sequence length (A*M)). Also, the UE allocates respective base sequences to the subcarriers of PUCCH resources included in the A PRBs.

In the mapping method based on above (b), a sequence length to match (or proportional to) a transmission bandwidth (which may be referred to as a "frequency resource unit," a "unit," etc.) corresponding to 1 UCI may be used. In this case, if the transmission bandwidth of the PUCCH is A PRBs and the transmission bandwidth (may be referred to as "unit") corresponding to 1 UCI is B PRBs (B<A), and the number of subcarriers in a PRB is M, the UE generates A*M base sequences of $X_0, X_1, \ldots, X_{B*M-1}$ (sequence length (B*M)). Also, in PUCCH resources included in A PRBs, the UE allocates respective base sequences to the subcarriers of each UCI unit (B PRBs).

According to the above mapping method (b), by reporting different UCIs for each unit, the total number of UCI bits to report can be increased. Moreover, compared to allocating orthogonal resources (for example, orthogonal codes, orthogonal sequences, amounts of phase rotation, cyclic shifts, etc.) to match the total number of UCI bits to the UE, the base station's receiving processes can be simplified, and the number of orthogonal resources can be saved.

For example, when a 6-bit UCI is reported, if all patterns of orthogonal codes can be used, the receiver needs to perform MLD 64 times ($=2^6$) (for example, the number of spreading codes to allocate is also 64). Meanwhile, according to the above mapping method (b), when 3 units, each corresponding to a 2-bit UCI, are reported, the receiver has to perform MLD 12 times ($=3*2^2$) (the number of spreading codes to allocate is also 12).

FIGS. 11A and 11B are diagrams to show examples of resource mapping for sequences having a sequence length to match the whole of the PUCCH bandwidth. In this example, A=6 and M=12, but this is by no means limiting. FIG. 11A corresponds to the mapping method based on above (a), and FIG. 11B corresponds to the mapping method based on above (b) (3 frequency resources, each comprised of 2 PRBs, are allocated non-contiguously).

In FIG. 11A, the UE maps a signal sequence for 1 UCI (UCI #1) to 6 PRBs of frequency resources. To be more specific, the UE generates base sequences $X_0, X_1, \ldots, X_{71}$, and maps these base sequences to each subcarrier included in the PUCCH bandwidth. Note that the order of mapping base sequences is not limited to that illustrated in the drawing. For all base sequences, the same α corresponding to UCI #1 is applied.

In FIG. 11B, although the PUCCH bandwidth is divided into 3 parts, the point that the UE maps a signal sequence for 1 UCI (UCI #1) to 6 PRBs of frequency resources is the same as in FIG. 11A.

FIGS. 12A and 12B are diagrams to show examples of resource mapping in the event the same UCI is reported in a sequence-based PUCCH in a number of units. In this example, A=6 and M=12, but this is by no means limiting. Also, within 6 PRBs, 3 units, each comprised of 2 PRBs, are allocated contiguously (FIG. 12A) or non-contiguously (FIG. 12B). FIG. 12A corresponds to the mapping method based on above (a), and FIG. 12B corresponds to the mapping method based on above (b).

In FIG. 12A, the UE maps a signal sequence for 1 UCI (UCI #1) to the frequency resources of individual units (units #1 to #3). To be more specific, the UE generates base sequences $X_0, X_1, \ldots, X_{23}$, and maps these base sequences to each subcarrier included in each unit. Note that the order of mapping base sequences is not limited to that illustrated in the drawing. For all base sequences, the same α corresponding to UCI #1 is applied.

In FIG. 12B, the 3 units are formed non-contiguously, but the point that the UE maps a signal sequence for 1 UCI (UCI #1) to the frequency resources of each unit is the same as in FIG. 12A.

FIGS. 13A and 13B are diagrams to show examples of resource mapping in the event a number of units report different UCIs using a sequence-based PUCCH. In this example, A=6 and M=12, but this is by no means limiting. Also, within 6 PRBs, 3 units, each comprised of 2 PRBs, are allocated contiguously (FIG. 13A) or non-contiguously (FIG. 13B). FIG. 13A corresponds to the mapping method based on above (a), and FIG. 13B corresponds to the mapping method based on above (b).

In FIG. 13A, the UE maps signal sequences of separate UCIs (UCI #1 to #3) to the frequency resources of each unit (unit #1 to #3). To be more specific, the UE generates base sequences $X_0, X_1, \ldots, X_{23}$, and maps these base sequences to each subcarrier included in each unit. Note that the order of mapping base sequences is not limited to that illustrated in the drawing.

Different αs are applied to the base sequences for UCIs #1, #2 and #3. For example, although α is simply shown in the drawings, but actually different as may be applied per UCI. UCIs #1, #2 and #3 correspond to a set of phase rotation amounts, respectively, for example, even when the same α is used, the same α may correspond to different information per UCI.

In FIG. 13B, 3 units are formed non-contiguously, but the point that the UE maps a signal sequence for different UCIs (UCI #1 to #3) to the frequency resources of each unit is the same as in FIG. 13A.

[Hopping of Orthogonal Resources]

Even if the UE sends the same UCI using multiple units, it is not necessary to use the same orthogonal resources (for example, orthogonal code, amount of phase rotation and cyclic shift) for these units. That is, different orthogonal resources may be used for at least part of these multiple units, or orthogonal resources may hop (change) per unit. In this case, the receiver can detect UCI accurately, even if it receives strong interference from signals of specific sequences and/or orthogonal resources.

Figure 14:
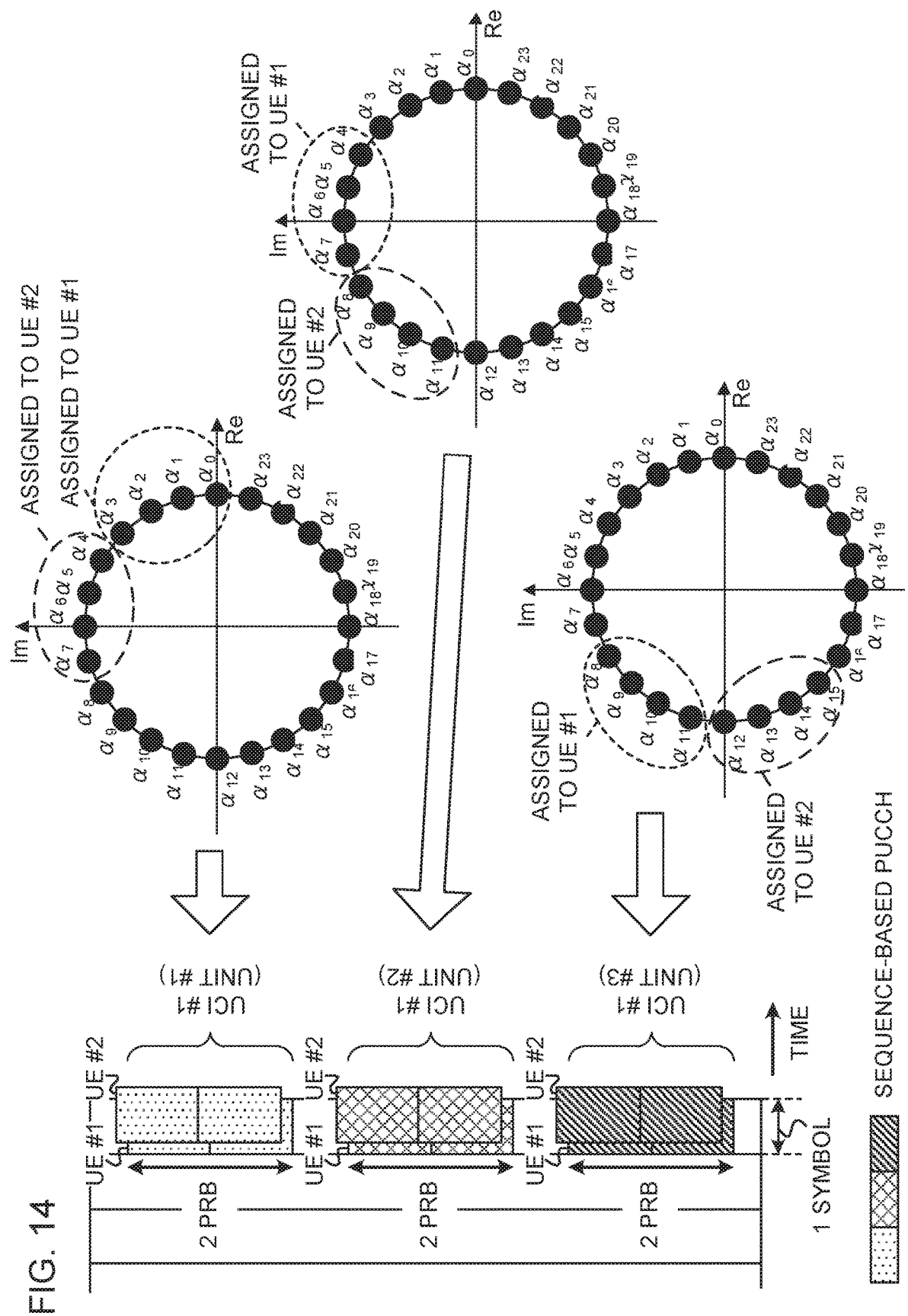
FIG. 14 is a diagram to show an example in which orthogonal resources hop in a number of units.

FIG. 14 is a diagram to show an example in which orthogonal resources hop in a number of units. This example illustrates a case in a number of UEs (for example, UE #1 and UE #2) each report 2-bit UCI. Similar to FIG. 12B, each UE maps the same UCI #1 to 3 units (unit #1 to #3) each comprised of 2 PRBs. Note that hopping can also be applied if multiple units are contiguous (neighbor each other) (for example, FIG. 12A).

In this example, each UE uses hopping amounts of phase rotation to sequences, per unit. To be more specific, the units and the amounts of phase rotation α used by the UEs are associated with each other as follows:

Unit #1: UE #1 uses $\alpha_1$ to $\alpha_3$, and UE #2 uses $\alpha_4$ to $\alpha_7$;
Unit #2: UE #1 uses $\alpha_4$ to $\alpha_7$, and UE #2 uses $\alpha_8$ to $\alpha_{11}$; and
Unit #3: UE #1 uses $\alpha_8$ to $\alpha_{11}$, and UE #2 uses $\alpha_{12}$ to $\alpha_{15}$.

As described above, according to this example, the orthogonal resource (the amount of phase rotation) for a given UE configured in a given unit is different from the orthogonal resource for another UE in this given unit, and also different from the orthogonal resource for this given UE in another unit.

As shown in FIG. 14, for example, the information "00," "01," "11," and "10" for UE #1 may correspond to $\alpha_0$ to $\alpha_3$ of unit #1, $\alpha_4$ to $\alpha_7$ of unit #2 and $\alpha_8$ to $\alpha_{11}$ of unit #3, respectively, the information "00," "01," "11," and "10" for UE #2 may correspond to $\alpha_4$ to $\alpha_7$ of unit #1, $\alpha_8$ to $\alpha_{11}$ of unit #2 and $\alpha_{12}$ to $\alpha_{15}$ of unit #3, respectively.

Note that, although a case has been with this example ion which the amount of phase rotation hops per unit, this is by no means limiting, and other orthogonal resources may hop as well. For example, the sequence index, the OCC index, the CS index and so forth may hop unit by unit.

Information on about prospective orthogonal resources (for example, orthogonal codes, orthogonal sequences, amounts of phase rotation and cyclic shifts) for each unit may be reported to the UE. For example, in the case of FIG. 14, $\alpha_0$ to $\alpha_3$, $\alpha_4$ to $\alpha_7$ and $\alpha_8$ to $\alpha_{11}$ may be reported to the UE as prospective amounts of phase rotation for units #1, #2 and #3, respectively. The UE may decide which orthogonal resource to apply to a given unit based on the prospective orthogonal resources reported.

Also, when information about the orthogonal resource (for example, orthogonal code, orthogonal sequence, amount of phase rotation and cyclic shift) for 1 unit is reported, the UE may specify the orthogonal resource for another unit according to a predetermined rule.

For example, if the index i corresponding to $\alpha_i$ is reported as the amount of phase rotation for 1 unit, the UE can assume the use of $[\alpha_i, \alpha_{i+Z}, \alpha_{i+2Z}, \dots]$ (the amount of phase rotation corresponding to the reported index i plus an integer multiple of Z (Z>0)) for each unit. Note that the index to use for each unit may be obtained by (i+integer multiple of Z) mod (the maximum number of amounts of phase rotation). Z may be, for example, the quantity of information (for example, if UCI is 2 bits, Z=4) that can be reported by using the sequence-based UCI of each unit. Furthermore, such predetermined rule may be configured by, for example, higher layer signaling, or may be determined in advance by specification.

Figure 15A:
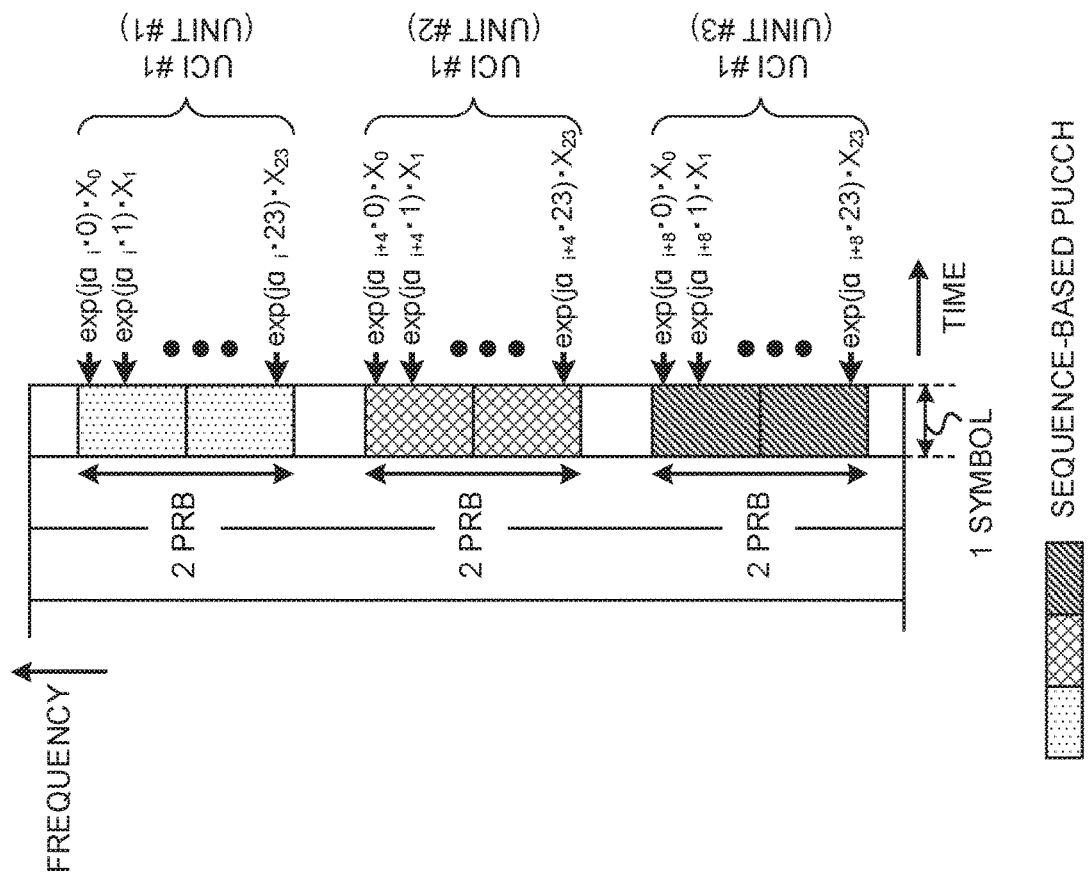
FIGS. 15A and 15B are diagrams to show examples of resource mapping in the event orthogonal resources hop in a number of units.
Figure 15B:
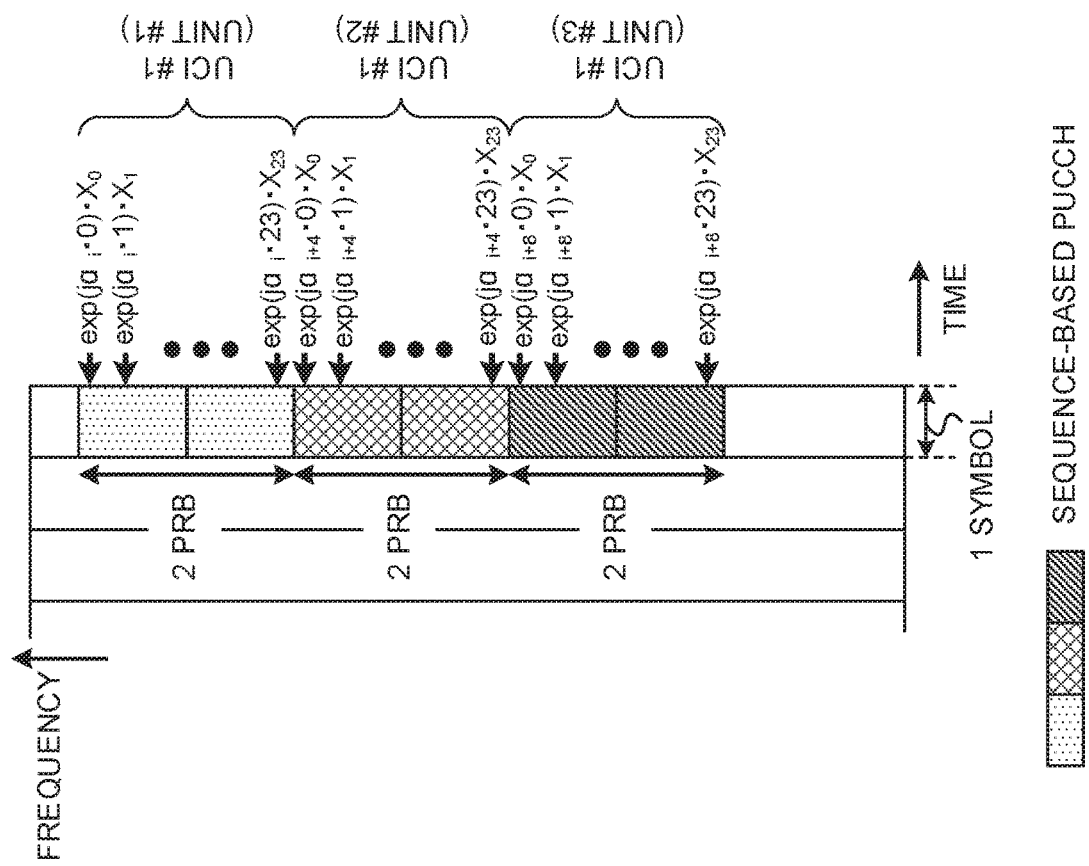

FIG. 15 are diagrams to show examples of resource mapping in the event orthogonal resources hop in a number of units. In this example, A=6 and M=12, but this is by no means limiting. Also, within 6 PRBs, 3 units, each comprised of 2 PRBs, are allocated contiguously (FIG. 15A) or non-contiguously (FIG. 15B). FIG. 15A corresponds to the mapping method based on above (a), and FIG. 15B corresponds to the mapping method based on above (b). Note that the amount of phase rotation corresponding to each unit is the same as in FIG. 14.

In FIG. 15A, the UE maps a signal sequence for 1 UCI (UCI #1) to the frequency resources of individual units (units #1 to #3). To be more specific, the UE generates base sequences $X_0, X_1, \dots, X_{21}$, and maps these base sequences to each subcarrier included in each unit. Note that the order of mapping base sequences is not limited to that illustrated in the drawing.

To the base sequences for UCI #1, #2 and #3, different as corresponding to the same information (index) are applied. For example, if the index corresponding to information to report as UCI is i (the amount of phase rotation is $\alpha_i$), $\alpha_i$ is used as the base sequence for UCI #1, $\alpha_{i+4}$ is used as the base sequence for UCI #2, and $\alpha_{i+8}$ is used as the base sequence for UCI #3.

In FIG. 15B, the 3 units are formed non-contiguously, but the point that the UE maps a signal sequence for 1 UCI (UCI #1) to the frequency resources of each unit is the same as in FIG. 12A.

[UCI Receiving Operation]

Next, the receiving/detection operation for sequence-based UCI will be described below. The receiving apparatus (for example, the network (base station)) may detect UCI (judge the contents of UCI) from received signals by using maximum likelihood detection (ML detection) (which may be referred to as "correlation detection").

Specifically, the receiving apparatus generates UCI base sequences (transmission signal sequences). Alternatively, replicas of the amounts of phase rotation (UCI phase rotation amount replicas) assigned to the transmitting apparatus (for example, a UE) may be generated (for example, 4 patterns may be generated when UCI is 2 bits), and transmission signal waveforms may be generated using the generated base sequences and UCI phase rotation amount replicas, in the same way as in the transmitting apparatus.

Also, the receiving apparatus may calculate the correlation between the transmission signal waveforms obtained thus, and the received signal waveforms received from the transmitting apparatus, for all the UCI phase rotation amount replicas, and assume that the UCI phase rotation amount replica with the highest correlation has been transmitted.

For example, the receiving apparatus generates transmission signal sequences (M complex-number sequences) by applying phase rotation, based on UCI phase rotation amount replicas, to a base sequence. The receiving device multiplies the received signal sequences (M complex-number sequences) after the DFT, having a size of M, with the complex conjugates of the transmission signal sequences, on an element by element basis, and calculates a likelihood based on the M sequences obtained.

The likelihood may be the sum of the absolute values (or the squares of the absolute values) of the multiplication results for each element of the received signal sequences and the transmission signal sequences. The receiving apparatus may estimate that the sequence-based UCI corresponding to the UCI phase rotation amount replica with the maximum likelihood among all the UCI phase rotation amount replicas has been transmitted.

In addition, the receiving apparatus may perform channel estimation using the UCI phase rotation amount replicas (for example, 4 times when the UCI is 2 bits), perform demodulation and error detection (or error correction) of UCI based on the results of channel estimation, and detect UCI by specifying the phase rotation amount replicas of UCI in which no error is detected (or the number of bits where error is detected is small).

The receiving apparatus may generate a transmission signal replicas to match the maximum number of phase rotation amounts that can be assigned (for example, 24 for the event of 2 PRBs), and estimate the phase rotation amount having the highest correlation with the received signal in the same operation as the above-described operation. When phase rotation amounts other than the assigned phase rotation amount are estimated, it may be presumed that the 1 closest to the estimated value among the assigned phase rotation amounts has been transmitted.

Even when a number of UEs are multiplexed, since received signals from these UEs are orthogonal to each other, the network can detect UCI by using the amount of phase rotation assigned to a specific UE.

Note that, in the case shown here, the UCI receiving operation for UCI generated by rotating the phase of the base sequence has been described, but this is by no means limiting. The "amount of phase rotation" may be replaced by another orthogonal resource or the like (for example, orthogonal code, orthogonal sequence, and cyclic shift).

As described above, according to one embodiment of the present invention, it is possible to reduce the possibility that the same sequence and/or the same orthogonal resource is used for sequence-based PUCCH between neighboring cells, and reduce interference. Also, even if the same sequence and/or the same orthogonal resource are used, interference can be reduced. In addition, UCI detection errors can be reduced.

(Radio Communication System)

Now, the structure of the radio communication system according to one embodiment of the present invention will be described below. In this radio communication system, communication is performed using 1 or a combination of the radio communication methods according to the herein-contained embodiments of the present invention.

Figure 16:
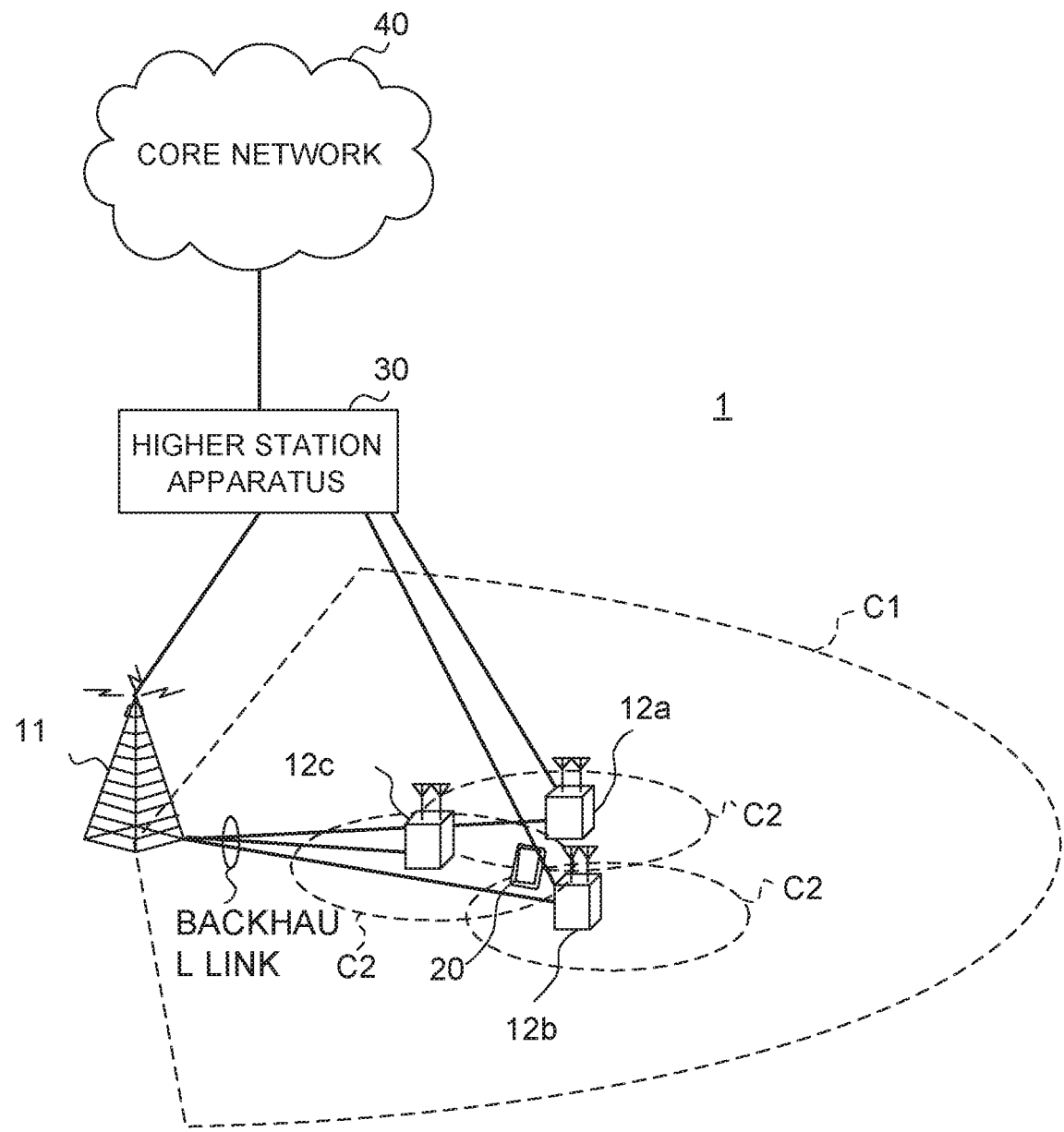
FIG. 16 is a diagram to show an exemplary schematic structure of a radio communication system according to one embodiment of the present invention.

FIG. 16 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into 1, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (fourth generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, 5 or fewer CCs or 6 or more CCs).

Between the user terminals 20 and the radio base station 11, communication can be carried out using a carrier of a relatively low frequency bandwidth (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency bandwidth (for example, 3.5 GHz, 5 GHz and so on) and a wide bandwidth may be used, or the same carrier as that used in the radio base station 11 may be used. Note that the structure of the frequency bandwidth for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or contiguous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, downlink control information (DCI) and so on, is communicated by the PDCCH.

Note that scheduling information may be reported via DCI. For example, the DCI for scheduling DL data reception may be referred to as "DL Assignment," and the DCI to schedule UL data transmission may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, the cell-specific reference signal (CRS (Cell-specific Reference Signal)), the channel state information reference signal (CSI-RS (Channel State Information-Reference Signal)), the demodulation reference signal (DMRS (DeModulation Reference Signal)), the positioning reference signal (PRS (Positioning Reference Signal)) and so on are communicated as downlink reference signals. Also, in the radio communication system 1, the measurement reference signal (SRS (Sounding Reference Signal)), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 17:
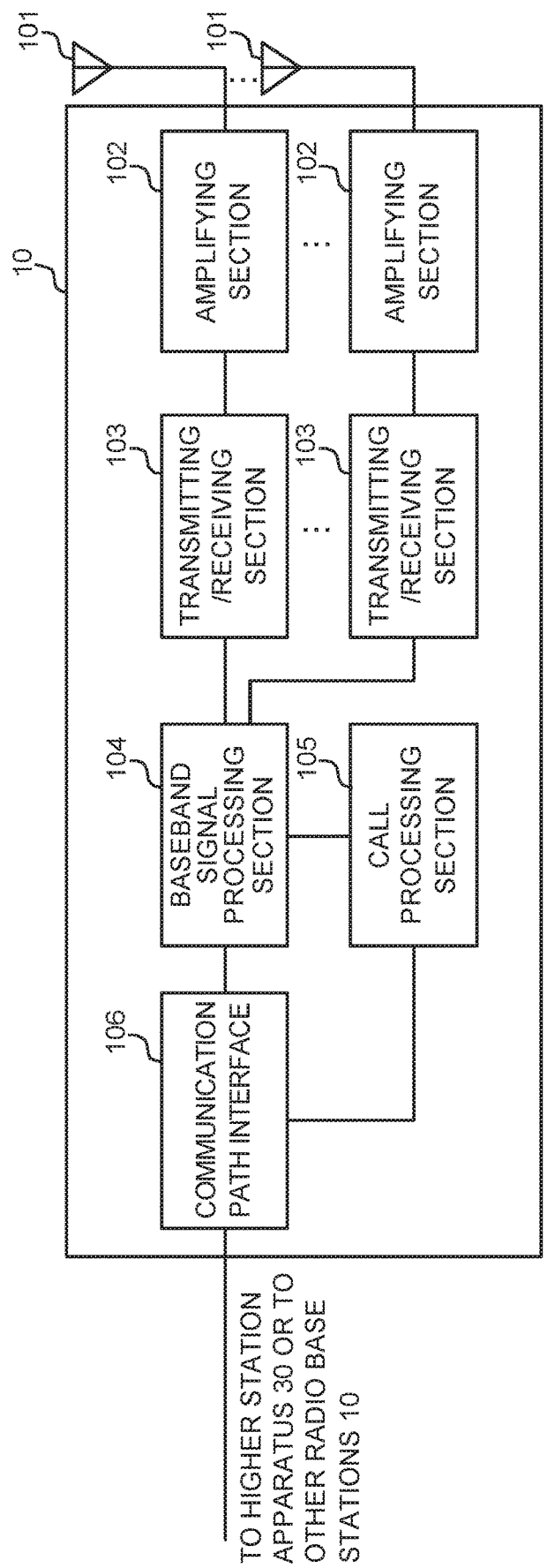
FIG. 17 is a diagram to show an exemplary of overall structure of radio base station according to one embodiment of the present invention.

FIG. 17 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using multiple TTIs of different lengths (TTI durations). For example, in one or more carriers (cells, CCs, etc.), the transmitting/receiving sections 103 may receive signals using a first TTI (for example, a long TTI) and a second TTI (for example, a short TTI) with a shorter TTI duration than the first TTI.

For example, the transmitting/receiving sections 103 may receive uplink control information (UCI) based on a sequence-based PUCCH and/or a DMRS-based PUCCH from the user terminal 20.

In addition, the transmitting/receiving sections 103 may transmit at least one of information about the base sequence for the sequence-based PUCCH, information about the allocation resource (for example, the transmission bandwidth) for the sequence-based PUCCH, information for specifying one of the sequence-based PUCCH and the DMRS-based PUCCH, information about the lower limit for the frequency bandwidth of the sequence-based PUCCH, information about the maximum number of orthogonal resources that can be used for the sequence-based PUCCH, and information about the orthogonal resource (and/or prospective orthogonal resources) for a given unit, to the user terminal 20.

Figure 18:
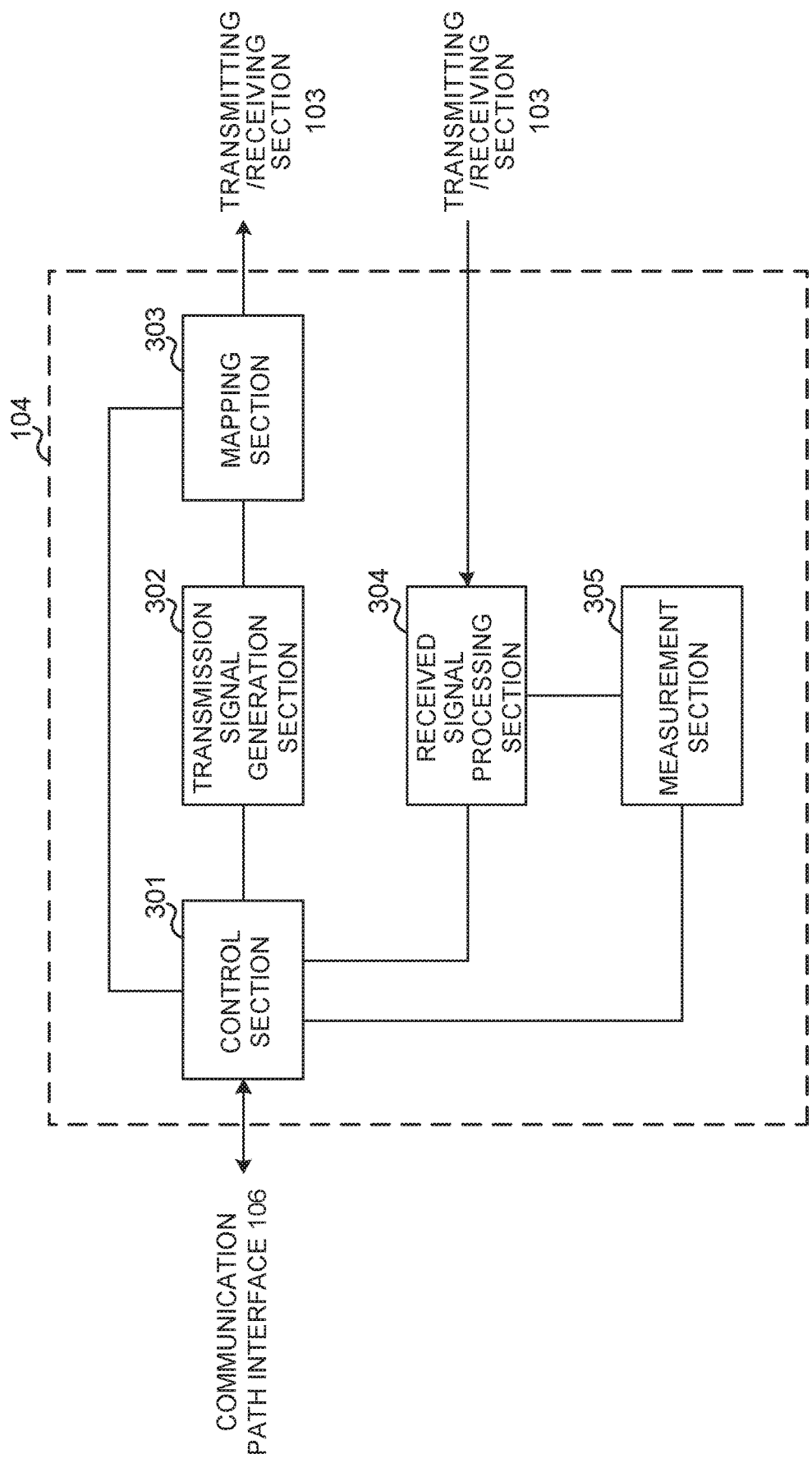
FIG. 18 is a diagram to show an exemplary functional structure of a radio base station according to one embodiment of the present invention.

FIG. 18 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 may control the scheduling of uplink data signals (for example, signals transmitted in the PUSCH), uplink control signals (for example, signals transmitted in the PUCCH and/or the PUSCH, such as acknowledgment information), random access preambles (for example, signal transmitted by the PRACH), uplink reference signals and so on.

The control section 301 controls the transmission and/or reception of signals in one or more CCs by using a first TTI (for example, a long TTI, a subframe, a slot, etc.) and a second TTI (for example, a short TTI, an sTTI, a minislot, etc.) with a shorter TTI duration than the first TTI.

The control section 301 receives signals in frequency resources (for example, PUCCH resources, PUCCH-transmitting PRBs, etc.) for transmitting uplink control information (for example, UCI). When the bandwidth of the above frequency resources is equal to or larger than a predetermined bandwidth (for example, 6 PRBs), the control section 301 may perform receiving processes on assumption that signals received (detected) in the above frequency resources have been transmitted in sequence-based PUCCH.

When the bandwidth of the above frequency resources is equal to or larger than a predetermined bandwidth (for example, 6 PRBs), the control section 301 may perform receiving processes on assumption that signals received (detected) in the above frequency resources have been transmitted in a DMRS-based PUCCH.

In order to make the user terminal 20 judge which orthogonal resources (for example, the number of orthogonal resources, configuration, etc.) are available for use, the control section 301 may exert control so that information about the above bandwidth of frequency resources and/or the above maximum number of orthogonal resources is transmitted to the user terminal 20.

The control section 301 may receive a number of signal sequences that correspond to the same UCI or different UCIs in these frequency resources. In this case, control section 301 may perform receiving processes on assumption that the orthogonal resources that are applied to these multiple signal sequences hop.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

(User Terminal)

Figure 19:
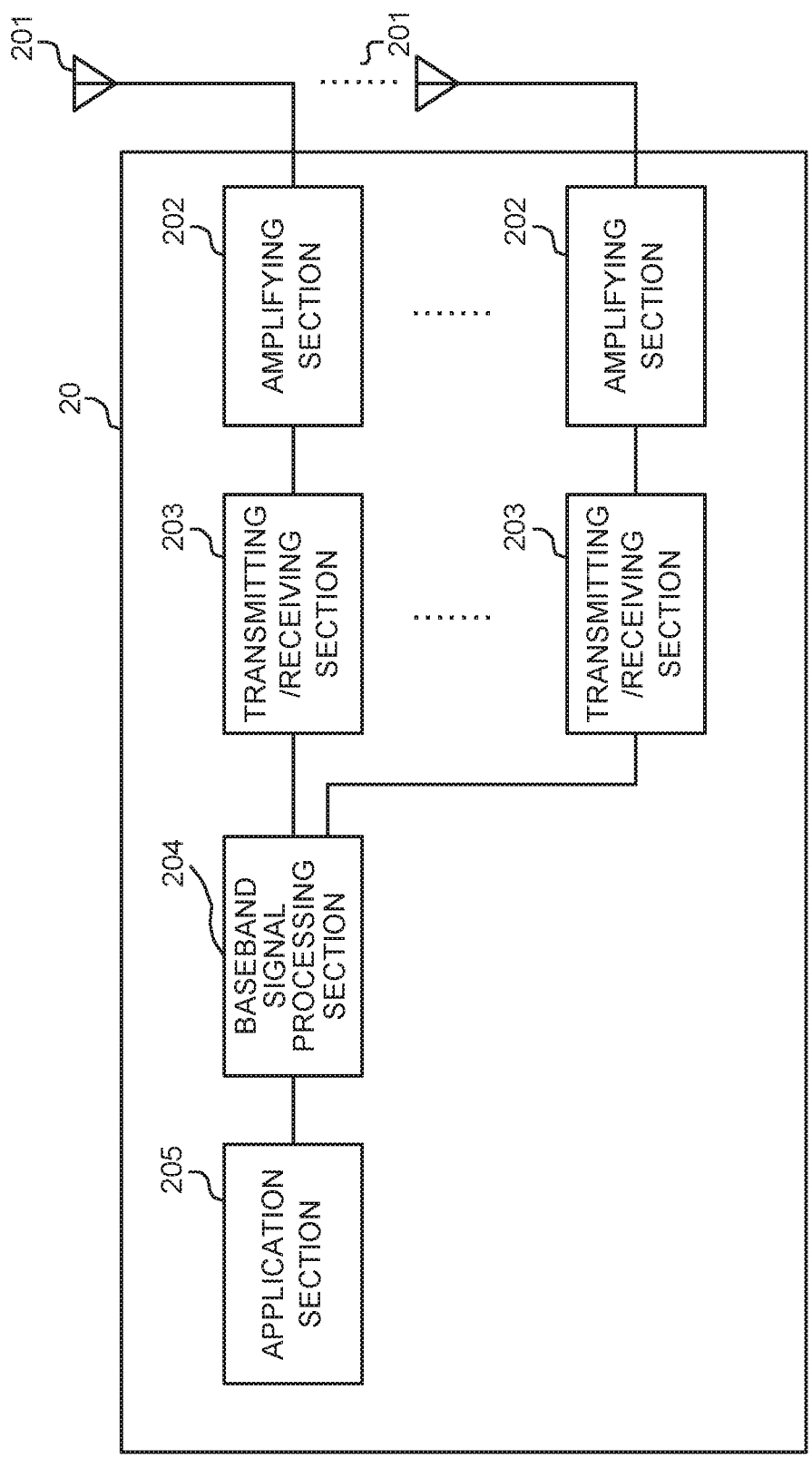
FIG. 19 is a diagram to show an exemplary overall structure of a user terminal according to one embodiment of the present invention.

FIG. 19 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using multiple TTIs of different lengths (TTI durations). For example, in one or more carriers (cells, CCs, etc.), the transmitting/receiving sections 203 may transmit signals using a first TTI (for example, a long TTI) and a second TTI (for example, a short TTI) with a shorter TTI duration than the first TTI.

For example, the transmitting/receiving sections 203 may transmit uplink control information (UCI) to the radio base station 10 by using at least one of a sequence-based PUCCH and/or a DMRS-based PUCCH.

In addition, the transmitting/receiving section 203 may receive at least one of information about the base sequence for the sequence-based PUCCH, information about the allocation resource (for example, the transmission bandwidth) for the sequence-based PUCCH, information for specifying one of the sequence-based PUCCH and the DMRS-based PUCCH, information about the lower limit for the frequency bandwidth of the sequence-based PUCCH, information about the maximum number of orthogonal resources that can be used for the sequence-based PUCCH, and information about the orthogonal resource (and/or prospective orthogonal resources) for a given unit, from the radio base station 10.

Figure 20:
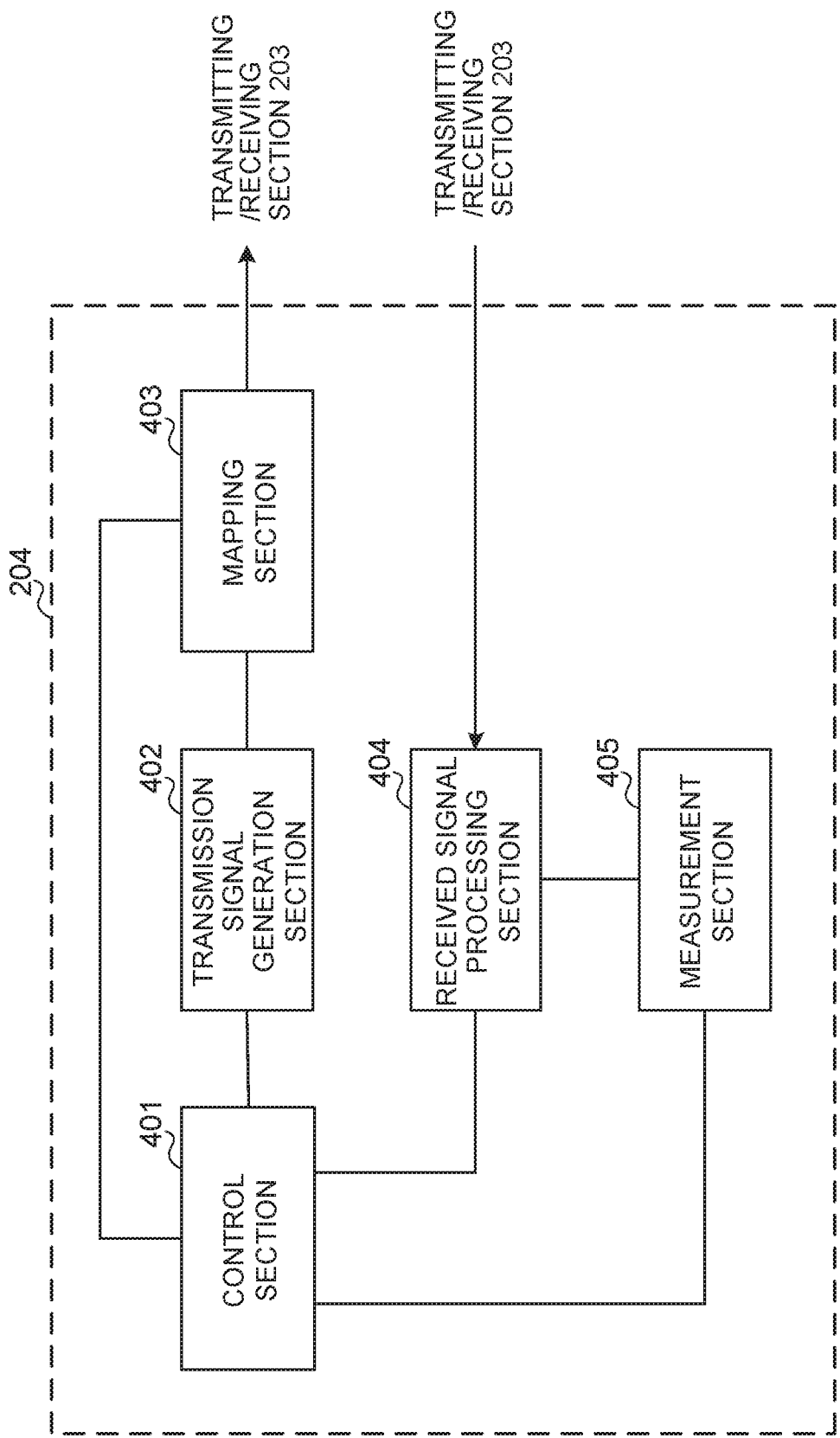
FIG. 20 is a diagram to show an exemplary functional structure of a user terminal according to one embodiment of the present invention.

FIG. 20 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In one or more CCs, the control section 401 controls the transmission and/or reception of signals using a first TTI (for example, a long TTI, a subframe, a slot, etc.) and a second TTI (for example, a short TTI, an sTTI, a minislot, etc.) having a shorter TTI duration than the first TTI.

The control section 401 selects the signals to transmit in frequency resources (for example, PUCCH resources, PUCCH-transmitting PRBs, etc.) for transmitting uplink control information (for example, UCI). If signals to transmit (to be transmitted) in the above frequency resources include a signal sequence (sequence) to use an orthogonal resource (for example, orthogonal code, orthogonal sequence, cyclic shift, time and/or frequency resources, etc.) associated with UCI, the control section 401 can assume that the bandwidth of the frequency resources is equal to or larger than a predetermined bandwidth (for example, 6 PRBs).

If signals to transmit (to be transmitted) in the above frequency resources include UCI and the DMRS for the UCI, the control section 401 can assume that the bandwidth of the above frequency resources is less than a predetermined bandwidth (for example, 6 PRBs).

The control section 401 may judge which orthogonal resources (for example, the number of orthogonal resources, configuration, etc.) are available for use based on information about the bandwidth of frequency resource and/or the maximum number of the orthogonal resources.

The control section 401 may transmit a number of signal sequences that correspond to the same UCI or different UCIs in these frequency resources. In this case, the control section 401 may exert control so that the orthogonal resources that are applied to these multiple signal sequences hop.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 21:
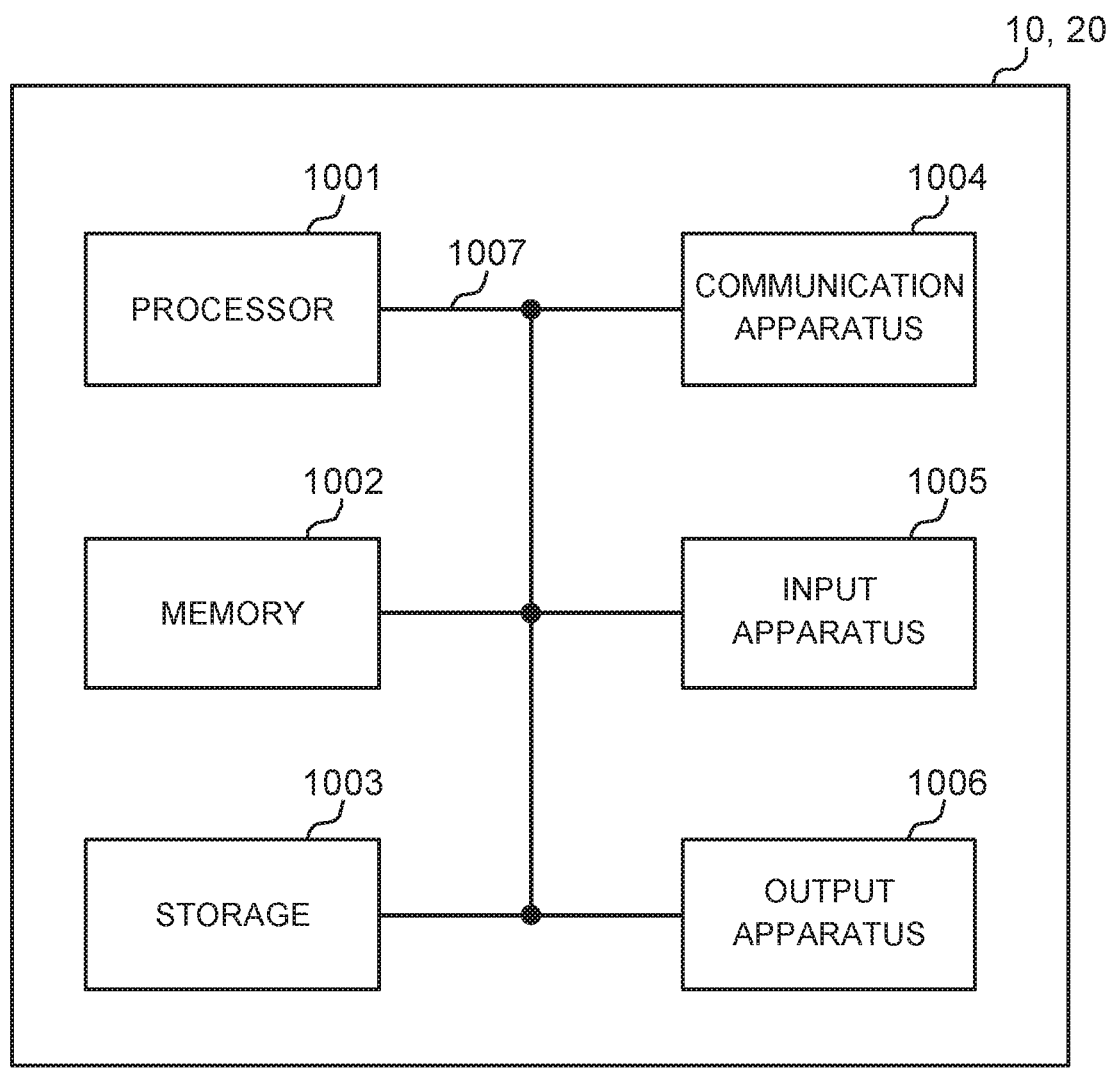
FIG. 21 is a diagram to show an exemplary hardware structure of a radio base station and a user terminal according to one embodiment of the present invention.

For example, the radio base station, user terminals and so on according to embodiments of the present invention may function as a computer that executes the processes of the radio communication method of the present invention. FIG. 21 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 mini-slot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a number of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access." As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017974, filed on Feb. 2, 2017, including the specification, drawings and abstract, is incorporated herein by reference in its entirety.

The invention claimed is:

1. A terminal comprising:
a processor that, when transmitting a signal sequence, to which a cyclic shift associated with a value of uplink control information to be reported is applied, using an uplink control channel, assumes that a transmission bandwidth of the uplink control channel is equal to or more than a given bandwidth; and
a transmitter that transmits the signal sequence in the transmission bandwidth,
wherein the cyclic shift is:
$\alpha_0$ in a case where the value is "00,"
$\alpha_0+\pi/2$ in a case where the value is "01,"
$\alpha_0+\pi$ in a case where the value is "11,"
$\alpha_0+3\pi/2$ in a case where the value is "10".

2. The terminal according to claim 1, wherein the processor determines an available cyclic shift based on information about a maximum number of the cyclic shift.

3. The terminal according to claim 1, wherein the transmitter transmits multiple signal sequences corresponding to same or different uplink control information in the transmission bandwidth.

4. The terminal according to claim 2, wherein the transmitter transmits multiple signal sequences corresponding to same or different uplink control information in the transmission bandwidth.

5. The terminal according to claim 3, wherein the processor hops cyclic shifts applied to the signal sequences.

6. A radio communication method for a terminal, comprising:
when transmitting a signal sequence, to which a cyclic shift associated with a value of uplink control information to be reported is applied, by using an uplink control channel, assuming that a transmission bandwidth of the uplink control channel is equal to or more than a given bandwidth; and
transmitting the signal sequence in the transmission bandwidth,
wherein the cyclic shift is:
$\alpha_0$ in a case where the value is "00,"
$\alpha_0+\pi/2$ in a case where the value is "01,"
$\alpha_0+\pi$ in a case where the value is "11,"
$\alpha_0+3\pi/2$ in a case where the value is "10".

7. A base station comprising:
a transmitter that transmits, to a terminal, information to instruct transmission using an uplink control channel of a signal sequence to which a cyclic shift associated with a value of uplink control information to be reported is applied; and
a receiver that receives the signal sequence in a transmission bandwidth of the uplink control channel that is assumed to be equal to or more than a given bandwidth in the terminal,
wherein the cyclic shift is:
$\alpha_0$ in a case where the value is "00,"
$\alpha_0+\pi/2$ in a case where the value is "01,"
$\alpha_0+\pi$ in a case where the value is "11,"
$\alpha_0+3\pi/2$ in a case where the value is "10".

8. A system comprising: a terminal; and a base station, the terminal comprising:
a processor that, when transmitting a signal sequence, to which a cyclic shift associated with a value of uplink control information to be reported is applied, using an uplink control channel, assumes that a transmission bandwidth of the uplink control channel is equal to or more than a given bandwidth; and
a first transmitter that transmits the signal sequence in the transmission bandwidth,
wherein the cyclic shift is:
$\alpha_0$ in a case where the value is "00,"
$\alpha_0+\pi/2$ in a case where the value is "01,"
$\alpha_0+\pi$ in a case where the value is "11,"
$\alpha_0+3\pi/2$ in a case where the value is "10," and
the base station comprising:
a second transmitter that transmits, to the terminal; information to instruct transmission of the signal sequence using the uplink control channel; and
a receiver that receives the signal sequence in the transmission bandwidth.

* * * * *